(12) United States Patent
Law et al.

(10) Patent No.: US 12,164,275 B2
(45) Date of Patent: Dec. 10, 2024

(54) SYSTEM AND METHOD FOR PROVIDING A VISUALIZATION OF SAFETY EVENTS OF A PROCESS CONTROL SYSTEM OVER TIME

(71) Applicant: FISHER-ROSEMOUNT SYSTEMS, INC., Round Rock, TX (US)

(72) Inventors: Gary K. Law, Georgetown, TX (US); Godfrey R. Sherriff, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/766,905

(22) PCT Filed: Oct. 7, 2016

(86) PCT No.: PCT/US2016/056047
§ 371 (c)(1),
(2) Date: Apr. 9, 2018

(87) PCT Pub. No.: WO2017/062801
PCT Pub. Date: Apr. 13, 2017

(65) Prior Publication Data
US 2018/0299854 A1    Oct. 18, 2018

Related U.S. Application Data

(60) Provisional application No. 62/239,647, filed on Oct. 9, 2015.

(51) Int. Cl.
*G05B 19/05* (2006.01)
*G05B 19/042* (2006.01)
(Continued)

(52) U.S. Cl.
CPC ............ *G05B 19/05* (2013.01); *G05B 19/042* (2013.01); *G05B 19/0426* (2013.01);
(Continued)

(58) Field of Classification Search
CPC .. G05B 19/04; G05B 19/042; G05B 19/0425; G05B 19/0426; G05B 19/0428;
(Continued)

(56) References Cited

U.S. PATENT DOCUMENTS 4,730,259 A    3/1988   Gallant
4,815,014 A *  3/1989   Lipner .................. G21C 17/00
                                                    700/83
(Continued)

FOREIGN PATENT DOCUMENTS

CN         1675603 A     9/2005
CN       101499020 A     8/2009
(Continued)

OTHER PUBLICATIONS

Siemens, "SIMATIC Safety Matrix User's Guide", May 2004 (Year: 2004).*
(Continued)

*Primary Examiner* — Hwei-Min Lu
(74) *Attorney, Agent, or Firm* — MARSHALL, GERSTEIN & BORUN LLP

(57) ABSTRACT

A system and method for visualizing safety events within a process plant includes accessing a cause and effect matrix (CEM) having a set of causes and a set of effects, wherein the set of causes and the set of effects are representative of a set of monitored safety events within the process plant. The system and method further includes receiving a selection of a monitored safety event of the set of monitored safety events. The system and method may also include displaying, in a user interface, (i) an indication of the monitored safety event, and (ii) a current status of the monitored safety event. The system and method may also include detecting a change in status to the monitored safety event. Further, the system and method may include displaying, in the user interface, an
(Continued)

updated status of the monitored safety event according to the change in status.

27 Claims, 17 Drawing Sheets

(51) Int. Cl.
*G05B 23/02* (2006.01)
*G06F 3/0482* (2013.01)
*G06F 3/04847* (2022.01)

(52) U.S. Cl.
CPC ....... *G05B 19/0428* (2013.01); *G05B 19/056* (2013.01); *G05B 19/058* (2013.01); *G05B 23/0248* (2013.01); *G06F 3/0482* (2013.01); *G06F 3/04847* (2013.01); *G05B 2219/13107* (2013.01); *G05B 2219/14006* (2013.01); *G05B 2219/23258* (2013.01); *G05B 2219/23328* (2013.01); *G05B 2219/24015* (2013.01); *G05B 2219/25118* (2013.01); *G05B 2219/2609* (2013.01)

(58) Field of Classification Search
CPC .... G05B 19/048; G05B 19/05; G05B 19/056; G05B 19/058; G05B 23/0248; G05B 2219/13107; G05B 2219/14006; G05B 2219/23258; G05B 2219/23328; G05B 2219/24015; G05B 2219/25118; G05B 2219/2609; G06F 3/0482; G06F 3/04847
USPC ........................................................ 715/771
See application file for complete search history.

(56) References Cited

U.S. PATENT DOCUMENTS

| | | | |
|---|---|---|---|
| 5,631,825 A * | 5/1997 | van Weele | G05B 19/41875 700/83 |
| 6,268,853 B1 | 7/2001 | Hoskins et al. | |
| 6,369,836 B1 * | 4/2002 | Larson | G06F 8/34 715/965 |
| 6,448,982 B1 | 9/2002 | Klapper et al. | |
| 6,553,268 B1 | 4/2003 | Schwenke et al. | |
| 6,898,468 B2 | 5/2005 | Ott et al. | |
| 6,941,261 B1 | 9/2005 | Quinn | |
| 7,096,078 B2 | 8/2006 | Burr et al. | |
| 7,165,226 B2 | 1/2007 | Thurner et al. | |
| 7,340,683 B2 | 3/2008 | Ueda | |
| 7,587,710 B2 | 9/2009 | Kleyer et al. | |
| 7,730,415 B2 | 6/2010 | Law et al. | |
| 7,987,445 B2 | 7/2011 | Fuller, III et al. | |
| 8,135,659 B2 | 3/2012 | Gaffga et al. | |
| 8,171,037 B1 | 5/2012 | Steen et al. | |
| 8,365,004 B2 | 1/2013 | Kishan | |
| 8,600,524 B2 | 12/2013 | Law et al. | |
| 8,892,218 B2 | 11/2014 | Shah et al. | |
| 9,134,720 B2 | 9/2015 | Shah et al. | |
| 9,367,064 B2 | 6/2016 | Gohr et al. | |
| 9,386,131 B2 | 7/2016 | Ku et al. | |
| 9,411,333 B2 | 8/2016 | Gohr | |
| 9,582,821 B2 | 2/2017 | Rehman et al. | |
| 9,904,746 B2 | 2/2018 | McKim et al. | |
| 10,152,031 B2 | 12/2018 | Nixon et al. | |
| 10,274,926 B2 | 4/2019 | Law et al. | |
| 2002/0194218 A1 | 12/2002 | Klapper et al. | |
| 2002/0198907 A1 * | 12/2002 | Klapper | G05B 19/4189 715/213 |
| 2003/0139837 A1 | 7/2003 | Marr | |
| 2004/0148513 A1 | 7/2004 | Scott et al. | |
| 2004/0153804 A1 | 8/2004 | Blevins et al. | |
| 2004/0193290 A1 * | 9/2004 | Ott | G05B 9/02 700/86 |
| 2004/0243654 A1 | 12/2004 | Burr et al. | |
| 2004/0255013 A1 | 12/2004 | Ott et al. | |
| 2005/0033466 A1 * | 2/2005 | Eryurek | G05B 19/41865 700/108 |
| 2005/0102651 A1 | 5/2005 | Ueda | |
| 2005/0165768 A1 | 7/2005 | Coulson et al. | |
| 2005/0172258 A1 | 8/2005 | Nixon et al. | |
| 2005/0197806 A1 | 9/2005 | Eryurek et al. | |
| 2006/0168183 A1 | 7/2006 | Fuller et al. | |
| 2007/0214244 A1 | 9/2007 | Hitokoto et al. | |
| 2007/0276514 A1 * | 11/2007 | Martinez | G05B 9/02 700/80 |
| 2008/0016493 A1 | 1/2008 | Pouchak et al. | |
| 2008/0034345 A1 | 2/2008 | Curtis et al. | |
| 2008/0168311 A1 | 7/2008 | Pietrek | |
| 2008/0168356 A1 | 7/2008 | Eryurek et al. | |
| 2009/0113037 A1 | 4/2009 | Pouchak | |
| 2009/0260000 A1 | 10/2009 | Pilant et al. | |
| 2009/0292511 A1 | 11/2009 | Vrancic et al. | |
| 2010/0057809 A1 | 3/2010 | Ichino | |
| 2010/0168896 A1 | 7/2010 | Bennett | |
| 2010/0188410 A1 | 7/2010 | Gilbert et al. | |
| 2010/0211195 A1 | 8/2010 | Gebuhr et al. | |
| 2010/0222899 A1 | 9/2010 | Blevins et al. | |
| 2010/0229098 A1 | 9/2010 | Kueng | |
| 2011/0054637 A1 | 3/2011 | Girardey et al. | |
| 2011/0131455 A1 | 6/2011 | Law et al. | |
| 2011/0144777 A1 * | 6/2011 | Firkins | G05B 23/0272 700/83 |
| 2011/0202145 A1 | 8/2011 | Shah et al. | |
| 2011/0270418 A1 | 11/2011 | Law et al. | |
| 2011/0301725 A1 | 12/2011 | Kline, Jr. | |
| 2012/0004744 A1 | 1/2012 | Reusch et al. | |
| 2012/0016495 A1 | 1/2012 | Zondler et al. | |
| 2012/0029661 A1 | 2/2012 | Jones et al. | |
| 2012/0041570 A1 | 2/2012 | Jones et al. | |
| 2013/0006390 A1 | 1/2013 | Kreft et al. | |
| 2013/0096979 A1 * | 4/2013 | Bingham | G06Q 10/06 705/7.28 |
| 2013/0131843 A1 | 5/2013 | Gohr | |
| 2013/0138227 A1 * | 5/2013 | Gohr | G05B 23/0286 700/80 |
| 2014/0277619 A1 | 9/2014 | Nixon et al. | |
| 2014/0280528 A1 | 9/2014 | Brandes | |
| 2014/0282257 A1 | 9/2014 | Nixon et al. | |
| 2014/0309936 A1 * | 10/2014 | Abbassian | E21B 47/005 702/6 |
| 2015/0018977 A1 | 1/2015 | Law et al. | |
| 2015/0105878 A1 | 4/2015 | Jones et al. | |
| 2015/0127123 A1 | 5/2015 | Shah et al. | |
| 2015/0170463 A1 | 6/2015 | Singer et al. | |
| 2015/0178422 A1 | 6/2015 | McKim et al. | |
| 2015/0186118 A1 | 7/2015 | Prosak et al. | |
| 2015/0187524 A1 | 7/2015 | Prosak et al. | |
| 2015/0193418 A1 | 7/2015 | Koska et al. | |
| 2015/0261215 A1 | 9/2015 | Blevins et al. | |
| 2015/0277425 A1 | 10/2015 | Law et al. | |
| 2015/0370235 A1 | 12/2015 | Lloyd et al. | |
| 2016/0080173 A1 | 3/2016 | Quick et al. | |
| 2016/0188769 A1 * | 6/2016 | Aylott | G06Q 50/06 703/6 |
| 2016/0239608 A1 | 8/2016 | Cederstrom et al. | |
| 2017/0076181 A1 | 3/2017 | Bannister et al. | |
| 2018/0120823 A1 | 5/2018 | Murata | |

FOREIGN PATENT DOCUMENTS

| | | | |
|---|---|---|---|
| CN | 101900995 A | | 12/2010 |
| CN | 101978405 A | | 2/2011 |
| CN | 102073957 A | | 5/2011 |
| CN | 102637019 A | | 8/2012 |
| CN | 102959480 A | | 3/2013 |
| CN | 103065054 A | | 4/2013 |
| CN | 103097973 A | | 5/2013 |
| CN | 103807980 A | * | 5/2014 |
| CN | 104142679 A | | 11/2014 |
| JP | H05-072004 A | | 3/1993 |
| JP | H11-344589 A | | 12/1999 |
| JP | 2004-303247 A | | 10/2004 |

(56) References Cited

FOREIGN PATENT DOCUMENTS

| JP | 3943760 B2 * | 7/2007 |
| --- | --- | --- |
| JP | 2008-310479 A | 12/2008 |
| JP | 2010-198562 A | 9/2010 |
| JP | 2011-70669 A | 4/2011 |
| JP | 2011-181072 A | 9/2011 |
| JP | 2015-018553 A | 1/2015 |
| WO | WO-00/38040 A1 | 6/2000 |
| WO | WO-2009/103089 A1 | 8/2009 |
| WO | WO-2009/156320 A1 | 12/2009 |

OTHER PUBLICATIONS

Siemens, "SIMATIC PCS 7 Process Control System Version 7.0 Catalog", Nov. 2007 (Year: 2007).*
Siemens, "SIMATIC Industrial Software Safety Matrix Configuration Manual", Feb. 2010 (Year: 2010).*
Fischer et al., "Neutral Representation, Visualization and Verification of Logic Controllers Represented by Function Block Diagrams," 2nd IFAC Workshop on Dependable Control of Discrete Systems, pp. 40-45 (2009).
International Preliminary Report on Patentability for Application No. PCT/US2016/056018, dated Apr. 10, 2018.
International Preliminary Report on Patentability for Application No. PCT/US2016/056024, dated Apr. 10, 2018.
International Preliminary Report on Patentability for Application No. PCT/US2016/056031, dated Apr. 10, 2018.
International Preliminary Report on Patentability for Application No. PCT/US2016/056039, dated Apr. 10, 2018.
International Preliminary Report on Patentability for Application No. PCT/US2016/056047, dated Apr. 10, 2018.
International Preliminary Report on Patentability for Application No. PCT/US2016/056054, dated Apr. 10, 2018.
International Search Report and Written Opinion for Application No. PCT/US2016/056018, dated Feb. 20, 2017.
International Search Report and Written Opinion for Application No. PCT/US2016/056024, dated Feb. 15, 2017.
International Search Report and Written Opinion for Application No. PCT/US2016/056031, dated Feb. 15, 2017.
International Search Report and Written Opinion for Application No. PCT/US2016/056039, dated Feb. 15, 2017.
International Search Report and Written Opinion for Application No. PCT/US2016/056047, dated Mar. 30, 2017.
International Search Report and Written Opinion for Application No. PCT/US2016/056054, dated Jan. 31, 2017.
Lin et al., "Structural Approach to the Synthesis of Control Systems," Chemical Engineering Research and Design, pp. 26-37 (1994).
Russo et al., "Application of Interactive Cause and Effect Diagrams to Safety-Related PES in Industrial Automation," Computer Safety, Reliability and Security, pp. 187-196 (2007).
Siemens Energy & Automation, Inc., "Configuration Guide: Safety Matrix Version 2.00 for QUADLOG Safety PLC," CGQL-7(Rev: 5): 1-100 (2002).
Notification of the First Office Action for Chinese Application No. 201680059065.0, dated Aug. 21, 2020.
Notice of Reasons for Rejection for Japanese Application No. 2018-518488, dated Oct. 6, 2020.
Notice of Reasons for Rejection for Japanese Application No. 2018-518521, dated Sep. 10, 2020.
Notifiation of the First Office Action for Chinese Application No. 201680059056.1, dated Jul. 2, 2020.
Notifiation of the First Office Action for Chinese Application No. 201680059057.6, dated Aug. 5, 2020.
Notifiation of the First Office Action for Chinese Application No. 201680059066.5, dated Aug. 27, 2020.
Notifiation of the First Office Action for Chinese Application No. 201680059067.X, dated Aug. 27, 2020.
Notifiation of the First Office Action for Chinese Application No. 201680059979.7, dated Jun. 23, 2020.
Notice of Reasons for Rejection for Japanese Application No. 2018-518482, dated Oct. 30, 2020.
Notice of Reasons for Rejection for Japanese Application No. 2018-518473, dated Oct. 23, 2020.
Notice of Reasons for Rejection for Japanese Application No. 2018-518520, dated Nov. 17, 2020.
Notice of Reasons for Rejection for Japanese Application No. 2018-518489, dated Nov. 10, 2020.
Notification of the Second Office Action for Chinese Application No. 201680059979.7, dated Apr. 16, 2021.
An et al., "Automated Cause and Effect Analysis for Process Plants," AIDIC Conference Series (2009).
Combined Search and Examination Report for Application No. GB2115996.7, dated Nov. 26, 2021.
Combined Search and Examination Report for Application No. GB2116094.0, dated Nov. 30, 2021.
Combined Search and Examination Report for Application No. GB2200356.0 dated Jan. 31, 2022.
Examination Report for Application No. GB1805355.3, dated Jan. 31, 2022.
Examination Report for Application No. GB1805352.0, dated May 21, 2021.
Examination Report for Application No. GB1805353.8, dated Jun. 21, 2021.
Examination Report for Application No. GB1805477.5, dated Jul. 8, 2021.
Notice of Reasons for Rejection for Japanese Application No. 2018-518482, dated Nov. 2, 2021.
Notification of the Second Office Action for Chinese Application No. 201680059057.6, dated Aug. 6, 2021.
Combined Search and Examination Report for Application No. GB2200469.1, dated Apr. 12, 2022.
Examination Report for Application No. GB2116094.0, dated Apr. 12, 2022.
Search Report for Application No. GB2118466.8, dated Jan. 26, 2022.

* cited by examiner

|  | Effect 1 | Effect 2 | Effect 3 | Effect 4 | Effect 5 | Effect 6 | Effect 7 |
|---|---|---|---|---|---|---|---|
| Cause 1 |  |  |  |  |  |  |  |
| Cause 2 |  |  | X | X | X —305 |  |  |
| Cause 3 |  |  |  | X |  |  |  |
| Cause 4 |  |  |  | X | X | X —310 |  |
| Cause 5 |  |  |  | X |  | X |  |
| Cause 6 |  |  | X |  |  |  |  |
| Cause 7 |  |  |  |  |  |  |  |

FIG. 3

|  | Effect 16 | Effect 1 | Effect 2 | Effect 13 | Effect 14 | Effect 3 | Effect 4 | Effect 5 | Effect 6 | Effect 7 | Effect 8 | Effect 9 | Effect 17 | Effect 10 | Effect 11 | Effect 12 | Effect 15 |
|---|---|---|---|---|---|---|---|---|---|---|---|---|---|---|---|---|---|
| Cause 14 |  |  |  | X | X |  |  |  |  |  |  |  |  |  |  |  |  |
| Cause 15 |  |  |  | X | X |  |  |  |  |  |  |  |  |  |  |  |  |
| Cause 1 |  | X | X | X | X |  |  |  |  |  |  |  |  |  |  |  |  |
| Cause 2 |  | X | X | X | X |  |  |  |  |  |  |  |  |  |  |  |  |
| Cause 3 |  | X | X | X | X |  |  |  |  |  |  |  |  |  |  |  |  |
| Cause 4 |  |  |  | X | X | X | X | X |  |  |  |  |  |  |  |  |  |
| Cause 5 |  |  |  | X | X | X | X | X |  |  |  |  |  |  |  |  |  |
| Cause 6 |  |  |  |  |  | X | X | X |  |  |  |  |  |  |  |  |  |
| Cause 7 |  |  |  |  |  | X | X | X |  |  |  |  |  |  |  |  |  |
| Cause 8 |  |  |  |  |  | X | X | X | X | X | X | X | X |  |  |  |  |
| Cause 9 |  |  |  |  |  | X | X | X | X | X | X | X | X |  |  |  |  |
| Cause 10 |  |  |  |  |  | X | X | X | X | X | X | X | X |  |  |  |  |
| Cause 16 |  |  |  | X | X |  |  |  | X | X | X | X |  |  |  |  |  |
| Cause 11 |  | X | X |  |  |  |  |  |  |  |  |  |  |  |  |  |  |
| Cause 12 | X |  |  |  |  |  |  |  |  |  |  |  | X |  |  |  |  |
| Cause 13 |  |  |  |  |  |  |  |  |  |  |  |  |  |  |  |  |  |

| | Effect 16 | Effect 1 | Effect 2 | Effect 13 | Effect 14 (1101 FE08) | Effect 3 | Effect 4 | Effect 5 (1102 07F0) | Effect 6 | Effect 7 | Effect 8 | Effect 9 | Effect 17 (1103 0072) | Effect 10 | Effect 11 | Effect 12 | Effect 15 |
|---|---|---|---|---|---|---|---|---|---|---|---|---|---|---|---|---|---|
| Cause 14 | | | | X | X | | | | | | | | | | | | |
| Cause 15 | | | | X | X | | | | | | | | | | | | |
| Cause 1 | | X | X | X | X | | | | | | | | | | | | |
| Cause 2 | | X | X | X | X | | | | | | | | | | | | |
| Cause 3 | | X | X | X | X | | | | | | | | | | | | |
| Cause 4 | | | | X | X | X | X | X | | | | | | | | | |
| Cause 5 | | | | X | X | X | X | X | | | | | | | | | |
| Cause 6 | | | | | | X | X | X | | | | | | | | | |
| Cause 7 | | | | | | X | X | X | | | | | | | | | |
| Cause 8 | | | | | | X | X | X | X | X | X | X | X | | | | |
| Cause 9 | | | | | | X | X | X | X | X | X | X | X | | | | |
| Cause 10 | | | | | | X | X | | X | X | X | X | X | | | | |
| Cause 16 | | | | X | X | | | | X | X | X | X | | | | | |
| Cause 11 | | X | X | | | | | | | | | | | | | | |
| Cause 12 | X | | | | | | | | | | | | X | | | | |
| Cause 13 | | | | | | | | | | | | | | | | | |

| IL | TAG NUMBER | TAG NUMBER | PRODUCTION 1 | PRODUCTION 41 | XZY-110601 42 | XZY-110602 43 | XZY-110603 44 | 45 | 46 | XZY-110604 47 | 48 | 49 |
|---|---|---|---|---|---|---|---|---|---|---|---|---|
| | XS-110549 | 24 | | | | | | | | | | |
| | XS-110647 | 25 | | | | 1 | 1 | | | 1 | | |
| | XS-110648 | 26 | | | | 2 | 2 | | | 2 | | |
| | XS-110649 | 27 | | | | 2 | 2 | | | 2 | | |
| | | 28 | | | | | | | | | | |
| | | 29 | | | | | | | | | | |
| | | 30 | | | | | | | | | | |
| | | 31 | | | | | | | | | | |
| | XZS-110450 | 32 | | | | 1T1 | 1X | | | 1X | | |
| | XZS-110451 | 33 | | | | 2T1 | 2X | | | 2X | | |
| | XZS-110452 | 34 | | | | 3T1 | 3X | | | 3X | | |
| | XS-110460 | 35 | | | | 1T1 | 1X | | | 1X | | |
| | XS-110461 | 36 | | | | 2T1 | 2X | | | 2X | | |
| | XS-110462 | 37 | | | | 3T1 | 3X | | | 3X | | |
| | XS-110463 | 38 | | | | T1 | X | | | X | | |
| | XZS-100451 | 39 | | | | | | | | | | |
| | XZS-100452 | 40 | | | T2 | T1 | X | | | X | | |
| | | 41 | | | | | | | | | | |
| | | 42 | | | | | | | | | | |
| | | 43 | | | | | | | | | | |
| | | 44 | | | | | | | | | | |
| | HZS-530507 | 45 | | | | R | R | | | R | | |
| | | 46 | | | | | | | | | | |
| | | 47 | | | | | | | | | | |

FIG. 18

SYSTEM AND METHOD FOR PROVIDING A VISUALIZATION OF SAFETY EVENTS OF A PROCESS CONTROL SYSTEM OVER TIME

RELATED APPLICATIONS

This patent application is a regular patent application that claims priority to and the benefit of the filing date of U.S. Provisional Patent Application Ser. No. 62/239,657, entitled "A System and Method for Configuring Separated Monitor and Effect Blocks of a Process Control System," which was filed on Oct. 9, 2015, and which is hereby expressly incorporated by reference herein.

FIELD OF THE DISCLOSURE

The present disclosure generally relates to managing a process control system within a process plant, and more particularly to configuring cause and effect matrices (CEM) associated with the process control system, and creating monitor blocks and effect blocks related thereto.

BACKGROUND

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Additionally, in many processes, a separate safety system is provided to detect significant safety related problems within the process plant and to automatically close valves, remove power from devices, switch flows within the plant, etc., when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event (typically called a "cause"), which may be a single condition or the simultaneous occurrence of two or more conditions, is detected, the safety controller takes some action (typically called an "effect") to limit the detrimental nature of the event, such as closing valves, turning devices off, removing power from sections of the plant, etc. Generally, these actions or effects include switching safety devices into a tripped or "safe" mode of operation which is designed to prevent a serious or hazardous condition within the process plant.

Operators of a process plant, such as managers and engineers, typically maintain a database structure which stores related causes and effects. For example, a matrix may have a plurality of rows and columns, with each row corresponding to a cause, each column corresponding to an effect and each cell of the matrix corresponding to a particular cause and effect relationship. The cells may be populated by various triggers which indicate the relationship between each cause and effect. So-called cause and effect matrices (CEMs) are generally configured according to requirement documents which define the safety design for the control system or plant. A control engineer may utilize the CEMs to engineer the control system such that the safety design is implemented accordingly. However, such CEMs are limited by the defined size of the matrix and frequently are not large enough to handle all desired cause/effect data relationships. Further, such CEMs are not able to handle more complex/sophisticated cause/effects, such as chaining, linking, leveling, looping, etc. Still further, a large CEM is tedious to implement into control logic, and thus is prone to error during implementation. In safety systems, maintaining an accurate CEM is imperative, as errors in the CEM can be serious because a failure of the safety system to operate properly can lead to serious injury or even death on the part of plant personnel and to the destruction of potentially millions of dollars of equipment and material within a plant.

SUMMARY

A process control system for a process plant may have a safety system that may be implemented or designed to effect the control logic defined in a cause and effect matrix (CEM), where the CEM is a summary of the safety actions for the process plant displayed in a visual representation. Generally speaking, the CEM defines the basic cause and effect relationships for various safety protocols or procedures within the process plant. Generally, a CEM may include a set of inputs and a set of outputs, wherein each of the set of inputs represents a condition within the process plant and each of the set of outputs represents an effect or action to be performed within the process plant. Further, at least some of the set of inputs and the set of outputs are related as cause-effect pairs whereby the corresponding effect activates in response to an occurrence of the corresponding condition or cause.

An administrator of the process control system may implement the CEM as a set of various function blocks. However, depending on the size and/or complexity of the process plant, a given CEM may contain numerous causes, effects, and cause-effect pairs, and may therefore require a corresponding numerous amount of function blocks to implement. This implementation can therefore become time consuming, complicated, and tedious, leading to potential implementation errors. According to the described systems and methods, various techniques for implementing a CEM within a process control system as a set of separated but interconnected function blocks described as monitor function blocks and effect function blocks to implement CEM logic are provided.

In one embodiment, the systems and methods may identify patterns and groupings within a CEM, and may implement a set of monitor blocks and a set of effect blocks according to the identified patterns and groupings, thus reducing the complexity of the implementation of the CEM. In an implementation, a grouping of data within a CEM (e.g., a column of the CEM) may be defined as a numerical representation of the logic defined by that portion of the CEM to provide an easy and less complicated manner of understanding and validating that the logic of the CEM is implemented within the function blocks (e.g., the monitor and effect blocks) used to implement the CEM logic. Still further, a tool may be used to analyze and to reorder or rearrange a CEM (e.g., the rows and/or columns of a CEM) to provide better, more logical, more easily implemented, etc., groupings of CEM logic to be implemented as one or more sets of cause and effect blocks.

The current disclosure provides additional techniques for managing a CEM. In particular, the systems and methods described herein may be used to configure a CEM to include interactive functionality. For example, a configured CEM may include links or selections to access one or more of documents detailing safety protocols that make up the cause and effect relationships of the CEM, graphs depicting the current and/or past statuses of one or more effects of the CEM to enable a user to more easily understand the previous conditions or operations with respect to particular effects as implemented in the plant, and diagrams of the process plant including devices related to causes and effects of the CEM.

Additionally, due to the often large amount of information contained in a CEM, it may be difficult for an engineer to identify any discrepancies or errors contained in a process control system. The systems and methods provided herein further enable a reverse engineering technique and system to be implemented to automatically create a test CEM that defines the CEM logic actually implemented by the devices and control logic in the process plant (or, in some implementations, the monitor and effect blocks within the process control system) and the required safety protocols for the particular process plant. Accordingly, the systems and methods described herein may compare the test CEM to the existing CEM to identify any discrepancies or errors between the actual configuration of the plant operation and that which may be detailed in a design document.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 3 is an illustration of an example cause and effect matrix;

FIG. 9 is an illustration of the second example of the cause and effect matrix of FIG. 8 which has been reorganized and configured into separate logic blocks;

FIG. 11 is an illustration of the second example of a cause and effect matrix with example numerical representations;

FIG. 18 is an illustration of an example cause and effect matrix including permissive and time delayed triggers.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
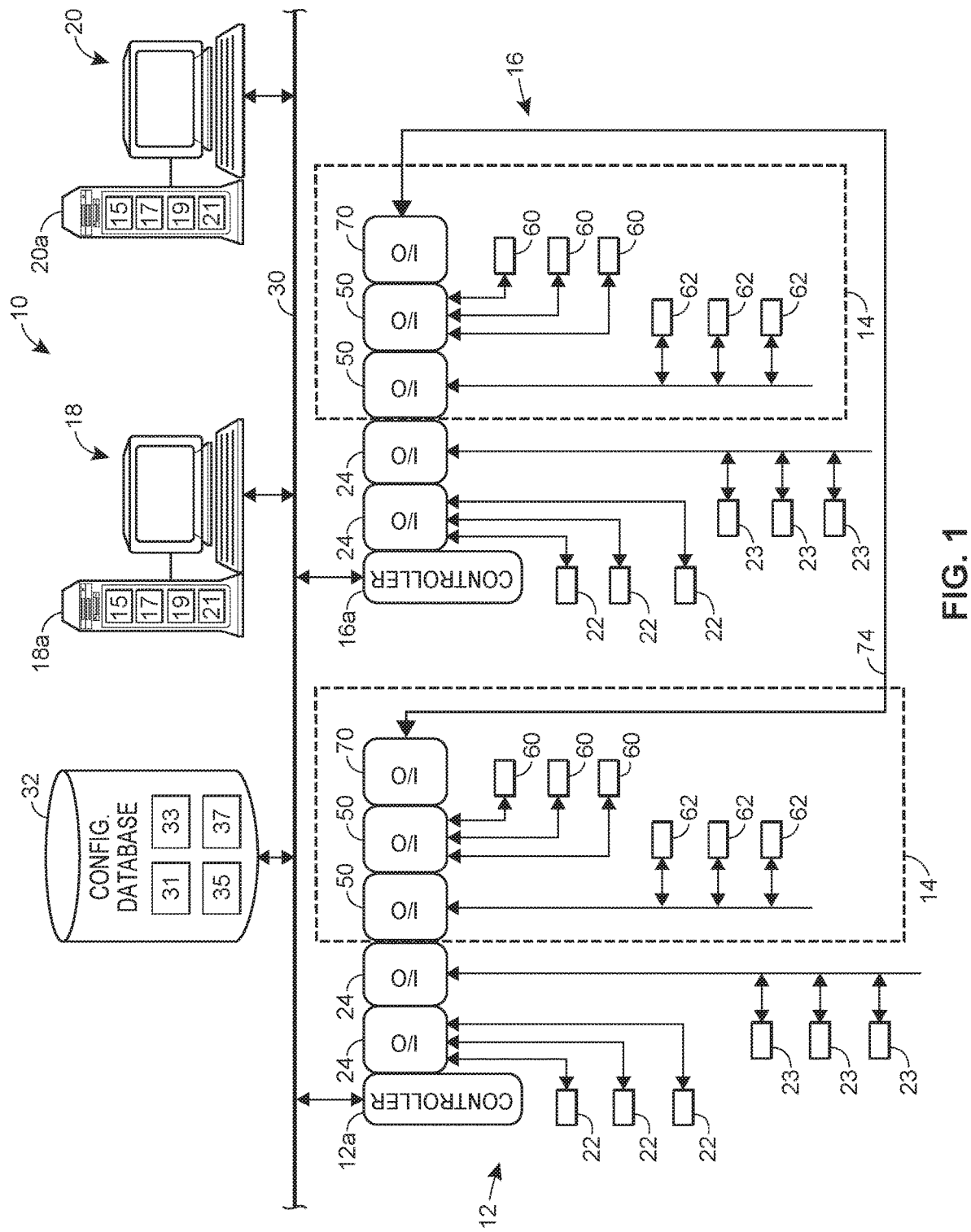
FIG. 1 is a block diagram of an example process plant.

FIG. 1 is a block diagram of an example process plant 10 that includes one or more nodes 12, 16, 18 and 20. In the example process plant 10 of FIG. 1, each of the nodes 12 and 16 includes a process controller 12a, 16a connected to one or more field devices 22 and 23 via input/output (I/O) devices 24 which may be, for example, Foundation Fieldbus interfaces, HART interfaces, etc. The controllers 12a and 16a are also coupled to one or more host or operator workstations 18a and 20a in the nodes 18 and 20 via a network 30 which may comprise, for example, one or more of a bus, a wired local area network (LAN) such as an Ethernet LAN, a wireless LAN, a wide area network (WAN), an intranet, etc. While the controller nodes 12, 16 and the I/O devices 24 and field devices 22, 23 associated therewith are typically located down within and distributed throughout the sometimes harsh plant environment, the operator workstation nodes 18 and 20 are usually located in control rooms or other less harsh environments easily assessable by controller personnel.

Generally speaking, the workstations 18a and 20a of the nodes 18 and 20 may be used to store and execute applications used to configure and monitor the process plant 10, and/or to manage devices 22, 23, 24 and controllers 12a, 16a in the process plant 10. For example the workstations 18a and/or 20*a* may contain tools such as a system navigator application 15, a cause and effect analyzer tool 17, a process control configuration application 19, and a safety configuration application 21 that may be implemented to manage the safety requirements of the process plant 10. The system navigator application 15 may be implemented to provide an interlinked group of user interfaces that provide information regarding the safety requirements and devices in the process plant. The cause and effect analyzer tool may be implemented to manage a cause and effect matrix (CEM) and/or create cause and effect matrices by reverse engineering from known safety requirements and/or function blocks. Further, the process control configuration application 19 and safety configuration application 21 provide a user with the ability to manage the devices of the process plant through the workstations 18*a* and/or 20*a*. A configuration database 32 may be connected to the network 30 and may operate as a data historian and/or a configuration database that stores the current configuration of the process plant 10 as downloaded to and/or stored within the nodes 12, 16, 18, 20. The configuration database may also contain rules 31 for rearranging CEMs, and/or numerical representations 33.

Each of the controllers 12*a* and 16*a*, which may be by way of example, the DeltaV™ controller sold by Emerson Process Management, may store and execute a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks typically perform one of an input function (such as that associated with a transmitter, a sensor or other process parameter measurement device), a control function (such as that associated with a control routine that performs PID, fuzzy logic, etc. control), or an output function which controls the operation of some device (such as a valve), to perform some physical function within the process plant 10. Of course hybrid and other types of function blocks exist and may be utilized. While a fieldbus protocol and the DeltaV™ system protocol may use control modules and function blocks designed and implemented in an object oriented programming protocol, the control modules could be designed using any desired control programming scheme including, for example, sequential function block, ladder logic, etc., and are not limited to being designed using function block or any other particular programming technique. As is typical, the configuration of the control modules as stored within the process control nodes 12 and 16 may be stored in the configuration database 32 which is accessible to applications executed by the workstations 18*a* and 20*a*. Function blocks may be stored in and executed by, for example, the controller 12*a*, 16*a*, which is typically the case when these function blocks are used for, or are associated with standard 4-20 ma devices and some types of smart field devices such as HART devices, or may be stored in and implemented by the field devices themselves, which can be the case with Fieldbus devices.

In the system illustrated in FIG. 1, the field devices 22 and 23 coupled to the controllers 12*a* and 16*a* may be standard 4-20 ma devices, or may be smart field devices, such as HART, Profibus, or Foundation Fieldbus field devices, which include a processor and a memory. Some of these devices, such as Foundation Fieldbus field devices (labeled with reference number 23 in FIG. 1), may store and execute modules, or sub-modules, such as function blocks, associated with the control strategy implemented in the controllers 12*a* and 16*a*. Of course, the field devices 22, 23 may be any types of devices, such as sensors, valves, transmitters, positioners, etc. and the I/O devices 24 may be any types of I/O devices conforming to any desired communication or controller protocol such as HART, Foundation Fieldbus, Profibus, etc.

The controllers 12*a* and 16*a* each include a processor that implements or oversees one or more process control routines, stored in a memory, which may include control loops, stored therein or otherwise associated therewith. The controllers 12*a* and 16*a* communicate with the field devices 22, 23, the workstations 18*a*, 20*a* and the database 32 to control a process in any desired manner. The controllers 12*a* and 16*a* each may be configured to implement a control strategy or control routine in any desired manner.

The process plant 10 may also include a safety system 14 (indicated by dotted lines) integrated with the process control nodes 12 and 16. The safety system 14 generally may operate as a Safety Instrumented System (SIS) to monitor and override the control provided by the process control nodes 12 and 16 to maximize the likely safe operation of the process plant 10.

Each of the nodes 12 and 16 may include one or more safety system logic solvers 50. Each of the logic solvers 50 is an I/O device having a processor and a memory, and is configured to execute safety logic modules stored in the memory. Each logic solver 50 is communicatively coupled to provide control signals to and/or receive signals from safety system field devices 60 and 62. Additionally, each of the nodes 12 and 16 may include at least one message propagation device (MPD) 70, which is communicatively coupled to other MPDs 70 via a ring or bus connection 74 (only part of which is illustrated in FIG. 1). The safety system logic solvers 50, the safety system field devices 60 and 62, the MPDs 70, and the bus 74 generally make up the safety system 14 of FIG. 1.

The logic solvers 50 of FIG. 1 may be any desired type of safety system control devices that include a processor and a memory that stores safety logic modules adapted to be executed on the processor to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. The safety field devices 60 may perform any desired function, such as that of a shut-down valve, a shut-off switch, etc. However, the safety system field devices 60 and 62 could be other types of devices, and could use other types of communication protocols to communicate with the logic solvers 50, including any desired wired or wireless communication protocol.

A common backplane (not shown) may be used in each of the nodes 12 and 16 to communicatively couple the controllers 12*a* and 16*a* to the process control I/O cards 24, to the safety logic solvers 50, and to the MPDs 70. The controllers 12*a* and 16*a* are also communicatively coupled to the network 30. The controllers 12*a* and 16*a*, the I/O devices 24, the logic solvers 50, the MPDs 70 may communicate with the nodes 18 and 20 via the network 30.

As will be understood by those of ordinary skill in the art, the backplane (not shown) in the node 12, 16 enables the logic solvers 50 to communicate locally with one another to coordinate safety functions implemented by these devices, to communicate data to one another, and/or to perform other integrated functions. Similarly, the backplane (not shown) in the node 16 enables the logic solvers 50 to communicate locally with one another to coordinate safety functions implemented by these devices, to communicate data to one another, and/or to perform other integrated functions. On the other hand, the MPDs 70 operate to enable portions of the safety system 14 that are disposed in vastly different locations of the plant 10 to still communicate with one another to provide coordinated safety operation at different nodes of the process plant 10. In particular, the MPDs 70 in conjunction with the bus 74 enable the logic solvers 50 associated with different nodes 12 and 16 of the process plant 10 to be communicatively cascaded together to allow for the cascading of safety-related functions within the process plant 10 according to an assigned priority. The MPDs 70 and the bus 74 provide the safety system with a communication link that is an alternative to the network 30.

Alternatively, two or more safety-related functions at different locations within the process plant 10 may be interlocked or interconnected without having to run a dedicated line to individual safety field devices within the separate areas or node of the plant 10 through the use of the MPDs 70 and the communication lines 74. In other words, the use of the MPDs 70 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10. It will be understood that the logic solvers 50 typically include the control logic that implements safety logic defined by one or more cause and effect matrices (CEMs).

Figure 2:
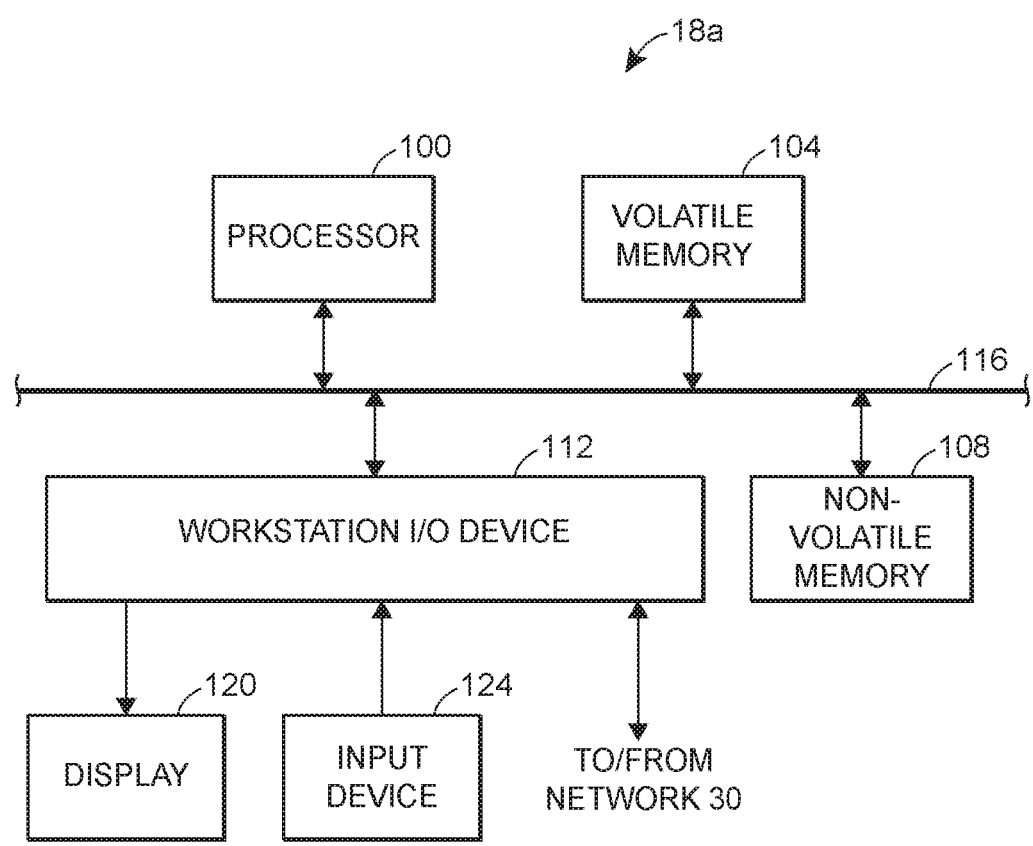
FIG. 2 is a block diagram of an example workstation schematically illustrated in FIG. 1.

FIG. 2 is a block diagram schematically illustrating the structure of an example workstation 18a (workstation 20a may comprise the same or similar device). The workstation 18a may include at least one processor 100, a volatile memory 104, and a non-volatile memory 108. The volatile memory 104 may include, for example, a random access memory (RAM). In some embodiments, the RAM may be backed up by one or more batteries so that data is not lost in the event of a power failure. The non-volatile memory 108 may include, for example, one or more of a hard disk, a read-only memory (ROM), a compact disk ROM (CD-ROM), a programmable ROM (PROM), an erasable programmable ROM (EPROM), an electrically erasable programmable ROM (EEPROM), a digital versatile disk (DVD), a flash memory, etc. The workstation 18a may also include a workstation I/O device 112. The processor 100, volatile memory 104, non-volatile memory 108, and workstation I/O device 112 may be interconnected via an address/data bus 116. The workstation 18a may also include at least one display device 120 and at least one user input device 124, which may be, for example, one or more of a keyboard, a keypad, a mouse, a track ball, a touch screen, a light pen, etc. In some embodiments, one or more of the volatile memory 104, non-volatile memory 108, and workstation I/O device 112 may be coupled to the processor 100 via a bus separate from the address/data bus 116 (not shown), or may be coupled directly to the processor 100.

The display device 120 and the user input device 124 are coupled with the workstation I/O device 112. Additionally, the workstation 18a is coupled to the network 30 via the workstation I/O device 112. Although the workstation I/O device 112 is illustrated in FIG. 2 as one device, it may comprise several devices. Additionally, in some embodiments, one or more of the display device 120 and the user input device 124 may be coupled directly to the address/data bus 116 or to the processor 100.

Referring now to FIGS. 1 and 2, a process control configuration application 19 associated with one or more of the control nodes 12, 16 may be stored on and executed by one or more of workstations 18a and 20a. For example, the process control configuration application 19 could be stored on the non-volatile memory 108 and/or the volatile memory 104, and executed by the processor 100. However, if desired, this application could be stored and executed in other computers associated with the process plant 10. Generally speaking, the process control configuration application 19 permits a programmer, control engineer, or other personnel to create and configure control routines, control modules, function blocks, programs, logic, etc., to be implemented by the controllers 12a, 16a, I/O devices 24, and/or the field devices 22, 23. These control routines, control modules, function blocks, programs, logic, etc., may then be downloaded to appropriate ones of the controllers 12a, 16a, I/O devices 24 and/or field devices 22, 23 via the network 30.

Similarly, a safety system configuration application 21 associated with the safety system 14 may be stored on and executed by one or more of workstations 18a and 20a. For example, the safety system configuration application 21 could be stored on the non-volatile memory 108 and/or the volatile memory 104, and executed by the processor 100. However, if desired, this application could be stored and executed in other computers associated with the process plant 10. Generally speaking, the safety system configuration application permits a programmer, safety engineer, or other personnel to create and configure safety related control routines, safety logic modules, function blocks, programs, logic, etc., to be implemented by the logic solvers 50, and/or the devices 60, 62. These control routines, safety modules, function blocks, programs, logic, etc., may then be downloaded to appropriate ones of the controllers 12a, 16a, the logic solvers 50, and/or the devices 60, 62 via the network 30.

Safety systems are typically programmed in one of several languages defined by the International Electrotechnical Commission (IEC) 61131-3 standard and in some cases the safety logic may be made up of a series of interconnected function blocks or other routines. Regardless of the programming language, the starting point is normally a narrative document that specifies the requirements for the controls and/or safety actions. In safety systems, the safety requirements are documented in the Safety Requirement Specification (SRS). The SRS, described in greater detail below, may provide logic descriptions which could be represented by either plain text, logic diagrams or cause-and-effect diagrams (also named cause and effect matrices). A cause and effect matrix (CEM) is a summary of the safety actions provided by the safety system in a simple visual representation. Thus, a CEM defines the basic cause and effect relationships implemented by the safety logic and is the base for the configuration of safety logic.

FIG. 3 illustrates one example representation of a CEM 300, which may be displayable via any type of display device. In particular, the display device may be part of a user interface associated with the safety configuration application 21, and the display may be presented to a programmer or administrator, for example, via the display device 120 of the workstation 18a. The example CEM 300, which is a CEM that may be utilized in conventional process control systems, contains a plurality of causes and a plurality of effects. The causes of the CEM are generally defined by the Safety Requirement Specification and relate to conditions indicated by, measured by, or detected by or at the logic solvers 50, the field device(s) 22, 23, 60 and 62, etc. throughout the process plant 10. A different cause C1, C2, etc., defined in the CEM 300 is associated with each row of the CEM 300. For example, one cause may be a sensor reading that the temperature of a particular area of the plant is out of a safe or predefined range.

When a condition corresponding to a cause occurs, an effect may be triggered, where an effect may be an action to be performed in the plant. A different effect, E1, E2, etc., of the CEM 300 is defined for and associated with each column of the CEM 300. For example, one effect of the CEM 300 (e.g., E3) may relate to a safety action to be performed in the plant, such as the closing of a valve, the sounding of an alarm, etc. When a particular cause (e.g., C2 or C6) triggers a particular effect (E3), then a corresponding cause and effect pair or relationship exists.

In the CEM 300, the cause and effect relationships are denoted by an "X" in each cell indicating that the effect associated with the cell column is triggered by the cause associated with the cell row. These relationships may be referred to herein as cause-effect pairs. In alternative implementations, the cells can be populated by various "triggers" which indicate more precisely how the associated cause and effect may be related. For example, triggers may be in form of an "X" which indicates that the effect will be activated immediately if the cause is received, "T" which means that the effect will be activated with a time delay if the cause is received, "P" which indicates that the effect will be permissive if the cause is received, etc. Further, an empty cell may indicate that a particular cause/effect pair is not currently related in the matrix, and may therefore not be active in the plant (i.e., that the occurrence of the cause has no triggering relationship to the effect).

The example CEM 300 is a 7×7 matrix, which may be smaller than a typical cause and effect matrix of a process plant, but which is shown in simple form for the sake of illustration. The example CEM 300 includes 10 cause/effect relationships denoted by an "X" in each of a set of corresponding cells. For example, cause 2 (C2) includes an "X" in each cell corresponding to effects 3, 4 and 5 (E3, E4, and E5), respectively. Thus, if the associated event of cause 2 (C2) occurs, the respective actions of effects 3, 4, and 5 (E3, E4, and E5) may be triggered within the process plant by safety logic modules in the plant. However, in some embodiments, each of the effects 3, 4 and 5 may also require other associated causes to occur before being triggered. For example, depending on the logic used in the system, effect 4 may require one or more of causes 2, 3, 4, and/or 5 to be activated before effect 4 is triggered (i.e., because effect 4 has an "X" for each of causes 2, 3, 4, and 5). Thus, the logic defined by a CEM may be based on "OR" logic (i.e., the occurrence of any one cause in the effect column will result in initiation of the effect) or may be based on "AND" logic (i.e., every cause in the effect column must exist before the effect will be triggered by the safety logic).

In another embodiment, effects (such as effect 4) may be triggered in different manners depending on which causes occur. For example, if one associated cause occurs, an effect (such as effect 4) may be triggered on a delay, while if two or more associated causes occur, an effect (such as effect 4) may be triggered immediately. Further, some associated causes may activate an automatic trigger while other causes may activate a delayed trigger for an effect, such as effect 4. Further still, some associated causes may trigger an effect independently of the other associated causes, while other associated causes may only trigger an effect when they exist in combination with one or more other causes. The examples provided are not intended to be limiting, and any combination of logic and/or delays may be implemented by corresponding cause and effect pairs.

As will be discussed in more detail, the logic defined by a CEM may be broken down into multiple sets or groups of logic implemented on subsets of the causes and effects defined by a CEM, and these different subsets of logic may be implemented by particular function blocks in a safety logic implementation. For example, the function blocks may be used to implement the logic defined by selected logic blocks 305 and 310 illustrated in the CEM 300. In this case, the logic block 305 would include two cause inputs (C2 and C3) and would correspond to three effect outputs (E3, E4, and E5). In this example embodiment, the subsets of logic to be implemented by the logic blocks 305 and 310 are identified by simply recognizing clusters of populated cells of the CEM 300. Here, the logic blocks 305 and 310, while only covering 12 of the 49 cells of the CEM 300, contain most of the important information (cause/effect relationships) indicated by the CEM 300. In other embodiments, the logic blocks 305 and 310 may be made larger and/or another logic block logic may be added or identified to include the remaining populated cell of CEM 300 not included in logic blocks 305 and 310. As will be discussed in greater detail below, a CEM may be rearranged to cluster populated cells better or more efficient manners to thereby aid in identifying logic blocks and, in turn, create function blocks. Although this clustering may seem like a trivial exercise given the CEM 300, it may be nearly impossible for a human to efficiently identify patterns in CEMs with hundreds (or thousands) of cells.

In conventional systems, CEMs are represented by state machine function blocks, where the causes are inputs and effects are outputs. Typically, a state machine function block is created for every effect in the CEM. As a result, state machine function blocks are limited in use by their defined size, and as such can proliferate extensively. However, unlike conventional systems, the present system organizes a CEM into two types of function blocks: monitor blocks and effect blocks, which serves to reduce the logic complexity and to increase the optimization of logic implementation within a safety system when implementing a complex or large CEM.

More particularly, using separate monitor blocks and effect blocks to implement any patterns or groups of logic defined in a corresponding CEM addresses the drawbacks of conventional systems by separating the causes from the effects into two different categories of blocks. Generally, monitor blocks (MBs) are abstract representations of causes, and effect blocks (EBs) are abstract representations of effects. As such, the system may represent a large CEM, and the causes and effects thereof, by one or more monitor blocks linked or otherwise connected to one or more effect blocks. For example, the outputs of a set of monitor blocks may serve as inputs into one or more effect blocks, and accordingly the inputs of each effect block may originate as outputs from one or more monitor blocks. In an embodiment, an output of a monitor block may alternatively or additionally serve as an input into one or more other monitor blocks. As a result, monitor blocks and/or effect blocks may be chained, nested, layered and/or leveled as desired in order to optimally implement any desired CEM logic. Moreover, representing (and implementing) a CEM as a plurality of MBs and EBs enables easier implementation and maintenance of safety systems and further allows for more complex CEM relationships to be easily represented and configured.

There are many advantages to creating separate monitor blocks and effect blocks. In particular, the MBs and EBs can be sized as desired, which leads to a quicker and simpler implementation that is less prone to error. Also, the control or safety system using these smaller sized MBs and EBs as function blocks to implement CEM logic can be more easily tested and trouble-shot (or generally, reverse engineered) due to the transparent depiction of the causal relationships. Further, a large CEM can be broken down into more manageable sized logic blocks. Further still, complex cause and effect relationships are more easily represented by using separate MBs and EBs. For example, layering, looping, nesting, chaining, etc. can all be depicted using separate monitor and effect blocks.

Figure 4:
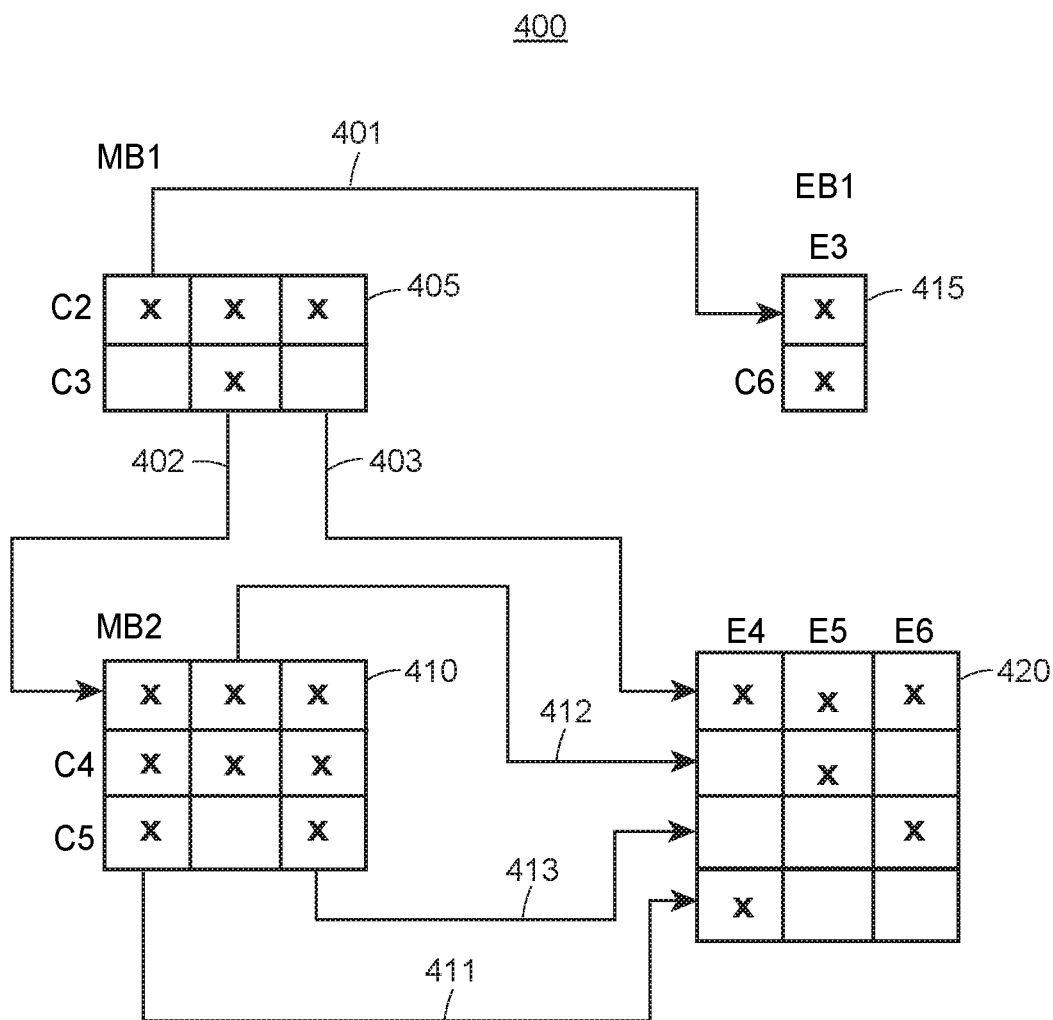
FIG. 4 is an illustration of an example set of monitor and effect blocks.

FIG. 4 is a schematic diagram 400 of a set of interconnected monitor blocks and effect blocks. The set of monitor and effect blocks of FIG. 4 includes (implements) all of the information or logic provided in or defined by the CEM 300 of FIG. 3. Here, monitor blocks 405 and 410 generally correspond to the causes (C2-C5) of the logic blocks 305 and 310 while effect blocks 415 and 420 generally correspond to the effects (E3, E4, E5, E6) of or associated with the logic blocks 305 and 310. For example, monitor block 1 (MB1) 405 includes cause 2 and cause 3 of CEM 300 as inputs. However, the outputs of MB1 405 do not directly correspond to the effects 3, 4 and 5 of CEM 300 (as with logic block 305). In contrast to the state machines which would normally be created to implement the logic of the logic blocks 305 and 310, which implement direct cause and effect relationships, monitor blocks may include inputs (such as causes and outputs from other monitor blocks) and outputs (which may be sent to other monitor blocks or the effect blocks) but which do not corresponding directly to effects. For example, the outputs of MB1 405 are sent to various other monitor and effect blocks in the set 400. In particular, an output 401 of the monitor block MB1 (405) is sent to an effect block 1 (EB1) 415, an output 402 of the monitor block MB1 is sent to a monitor block 2 (MB2) 410, and an output 403 of the monitor block MB1 is sent to an effect block 2 (EB2) 420.

The outputs of the MBs generally provide information regarding the corresponding inputs. For example, the output 401 provides information regarding cause 2 (the 'X' in the corresponding cell of MB1 405 denotes this relationship). Similarly, the output 402 provides information regarding both cause 2 and/or cause 3. For example, the output 402 could be high (a logical one) if either of causes C2 or C3 exist (e.g., are logically true) or the output 402 could be high only when both of the causes C2 and C3 exist. Of course, other logical operations could be performed with respect to the causes C2 and C3 to determine the output 402, such as exclusive ORing, etc. In a similar manner, an output 411 of MB2 410 provides information regarding the three inputs (output 402 of MB1 405, cause 4 and cause 5). In other words, the output 411 provides information regarding causes 2 and 3 (as defined by the logic which produced the output 402 of the cause block MB1) and causes 4 and 5.

Referring now to the effect blocks 415 and 420, the effect block 1 (EB1) 415 receives two inputs, namely output 401 from monitor block MB 1(which is dependent on the state of cause 2), and cause 6 (corresponding to cause 6 from the CEM 300). The effect block EB1 (415) only corresponds to one effect, that is effect 3. Thus, like the CEM 300, the effect block EB1 (415) correlates cause 2 and 6 to create the effect 3 which is the output of the effect block EB1 (415). As will be understood, the effect block EB1 (415) can implement any desired logic and delays based on the state of the output 401 (which again is related to the state of cause 2) and the state of the cause 6 (C6).

Likewise, the effect block EB2 (420) corresponds to and implements logic that creates or defines the states of effects 4, 5 and 6 of the CEM 300. Tracing the inputs of the effect block EB2 (420) back to the corresponding monitor blocks, it can be seen that the cause and effect relationships for effects 4, 5 and 6 of the CEM 300 are effected by the effect block EB2 (420). In particular, the effect block EB2 420 receives output 411 which is based on the causes 4 and 5 input to monitor block MB2 and which is based on the output 402 of the monitor block MB1. Thus, the output 411 has a value or state which is derived from causes 2, 3, 4 and 5 which is used to trigger effect 4 in the effect block EB2. Moreover, the effect block EB2 receives the outputs 403 and 412 which are logically defined by the causes to 2 and 4, and which are used in some logical expression to trigger the effect 5. Still further, the effect block EB2 receives the output 413 corresponding to or defined as a logical value based on causes 4 and 5, and uses the output 413 to trigger effect 6. In turn, the set of monitor and effect blocks 400 of FIG. 4 includes all of the relationship information (and logic) previously provided in or defined for the CEM 300 of FIG. 3. Although the advantages provided by decomposing the CEM 300 into the set of monitor and effect blocks 400 may not be distinct in this example, the advantages are more apparent when decomposing larger CEMs. It should be noted that the set of monitor and effect blocks 400 as depicted in FIG. 4 is only meant as an example and that monitor blocks and effect blocks can be created and organized in countless sizes and configurations to implement logic defined by a CEM.

Figure 5:
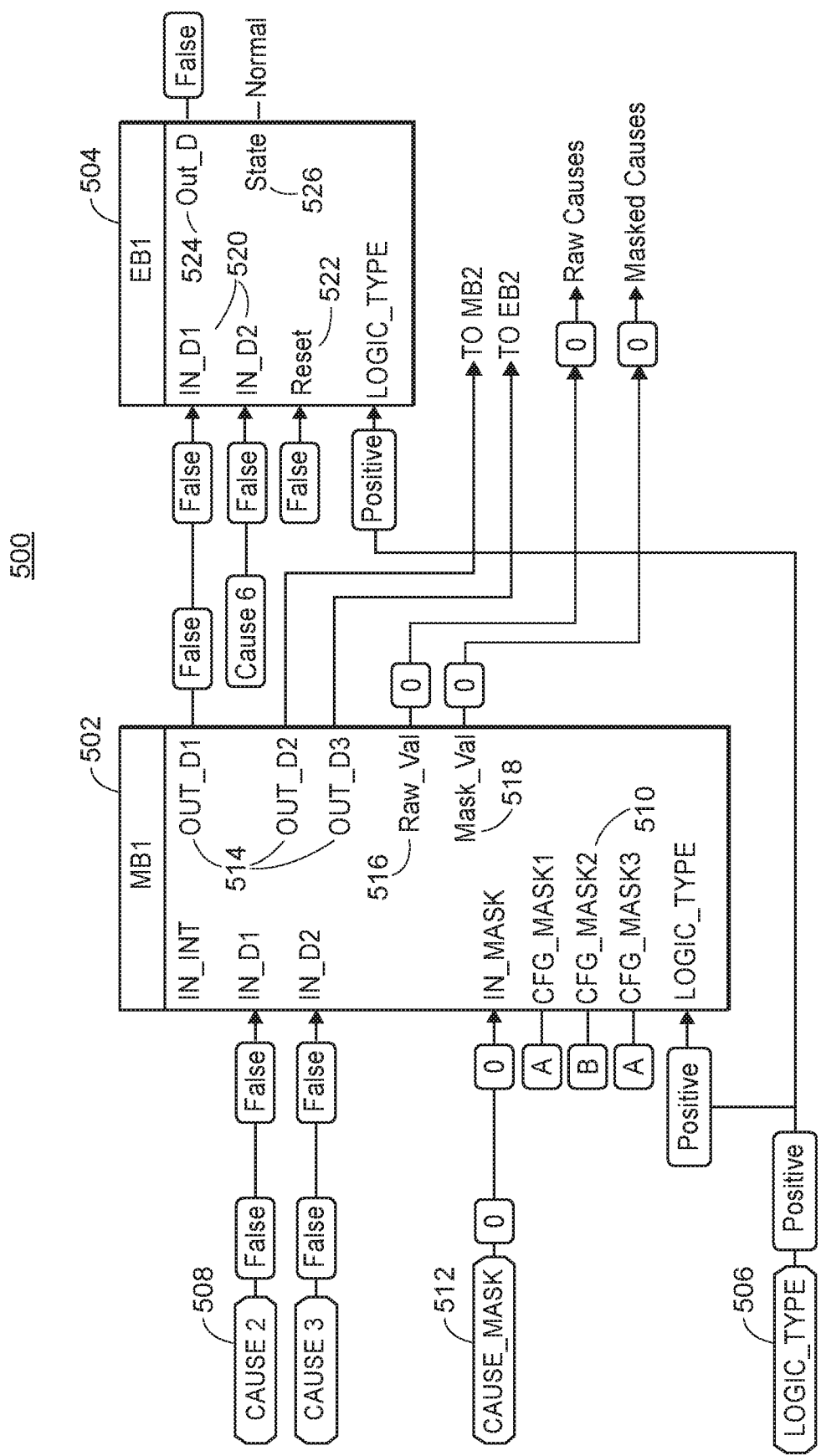
FIG. 5 is an illustration of a first example of a set of function blocks which may be used to implement monitor and effect blocks.

FIG. 5 is one example of an illustration of a configuration screen 500 which may be displayed by a display device and which represents or depicts a set of monitor and effect function blocks that implement logic of a CEM or a portion of a CEM. The configuration screen 500 is representative of a more detailed function block implementation of the monitor and effect blocks, as opposed to the set of monitor and effect blocks 400 which are intended as a schematic representation of the logic associated with the monitor and effect blocks. In the example of FIG. 5, the configuration screen 500 includes inputs (causes 508, cause mask 512, and logic type 506), a monitor block 502 which corresponds to the monitor block MB1 (405) of FIG. 4, and an effect block 504 which corresponds to effect block EB1 (415) of FIG. 4.

The monitor block 502 receives four inputs (IN_D1 and IN_D2, IN_MASK and LOGIC_TYPE) which respectively correspond to two causes 508, a cause mask input 512 and a logic type 506. The logic type 506 defines what type of logic is being implemented in the current monitor and effect block set. In an embodiment, the logic type may be positive or negative. Positive logic may indicate that all of the causes initially start in the "False" state, and if tripped become "True." Thus, if one or more causes are "True," the corresponding output may be "True." In turn, a corresponding effect block may receive one or more "True" inputs, which may elevate the status of the effect block and/or trigger the effect block. Negative logic may be similar, but with the causes initially starting as "True" and being set to "False" if the cause occurs. The example logic is not intended to be limiting and the logic type 506 may also include "AND" logic "OR" logic or any other logic that may be helpful in implementing the monitor and effect blocks.

The cause mask input 512 may represent an initial parameter for filtering causes 508 received by the monitor block 502. The monitor block 502 also includes three configuration masks CFG_MASK 1, CFG_MASK 2, and CFG_MASK 3 510 which are used to configure the monitor block 502, with each mask representing which causes correspond to each output and, in some cases, the logic used to generate the output from the non-masked inputs. The configuration masks 510 can be numerical representations derived from the CEM, as described in greater detail below.

The monitor block 502 also includes five outputs (OUT_D1 through OUT_D3 514, RAW_VAL 516 and MASK_VAL 518) with one of the outputs 514 (OUT_D1) serving as an input to the effect block 504 (as identified in the configuration of FIG. 4). The raw values 516 may simply output the received values of causes 508 while the masked values 518 may output the values of causes 508 after applying cause mask 512. Further, OUT_D1 through OUT_D3 correspond to outputs 401-403 of MB1 405 of FIG. 4. The configuration masks 510 indicate which causes correspond to each output. For example, CFG_MASK1 (of configuration masks 510) is set to 'A,' which may indicate that only Cause 2 (of causes 508) corresponds to OUT_D1 (of outputs 514). Further, CFG_MASK2 (of configuration masks 510) is set to 'B,' which may indicate that both Cause 2 and Cause 3 (of causes 508) corresponds to OUT_D2 (of outputs 514). Still further, in some cases, the configuration masks 510 may be numerical expressions, such as hexadecimal numbers, representing which monitor block inputs drive or effect a particular monitor block output, and/or the actual logic used to generate the block output from the block inputs.

As illustrated in FIG. 5, the effect block 504 may include four inputs (IN_D1 and IN_D2 520, a reset 522, and LOGIC_TYPE 506), and two outputs (state 526 and OUT_D 524). The inputs 520 of effect block 504 include an output 514 of monitor block 502 and also cause 6 of CEM 300 of FIG. 3. The state 526 of the effect block 504 may correspond to the operational state of the device corresponding to the effect block 504. In other words, if no corresponding "True" causes have been received, then the state 526 may be normal. However, if one or more causes set to the "True" value, for example, are received, the state may change to indicate the new status (e.g., "warning," "danger," "triggered"). The reset input 522 may allow a user to automatically reset the state of the effect block 504 to normal once the necessary actions have been performed when the effect block 504 is in a non-normal state. Of course, other state changing inputs may be provided to an effect block as well, such as a permit reset (e.g., upon a cause input or a monitor block input changing state, etc.) Further, the output, OUT_D, in this case corresponding to effect 3 of the CEM 300, may be the triggered response if one or more of the received inputs 520 are "True," because the logic type 506 in this example is set to positive.

As an example, FIG. 5 illustrates the state of each of the OUT_D1 (of block 502), IN_D2 and Out_D (of block 504) when the causes 2 and cause 3 inputs are "False" and the logic type of both blocks 502 and 504 are set to positive. Now, if cause 2 (of causes 508) were to occur in the process plant, the status of cause 2 may change from "false" to "true." Thus, MB1 502 would receive input IN_D1 as true. The corresponding outputs OUT_1 would then also change to true based on the positive logic type at the Logic_Type input and the configuration mask for OUT_D1 (output 1), i.e., CFG_MASK1. In this example, after the configuration masks 510 are applied, IN_D1 drives or effects the value of each of the outputs (OUT_D1 through OUT_D3) 514. In particular, OUT_D1 may be set to "true" based on IN_D1 being set to "true." Thus, EB1 504 would then receive at least one "True" input (IN_D1). As a result, the state 526 of EB1 504 would be changed to "triggered" and the output 524 OUT_D of the effect block 504 would be set to "True" which means the effect 3 of FIG. 4 would be triggered or "True." Consequently, the effect has been triggered and any corresponding action and/or alarm may be set off in the process control plant.

Figure 6:
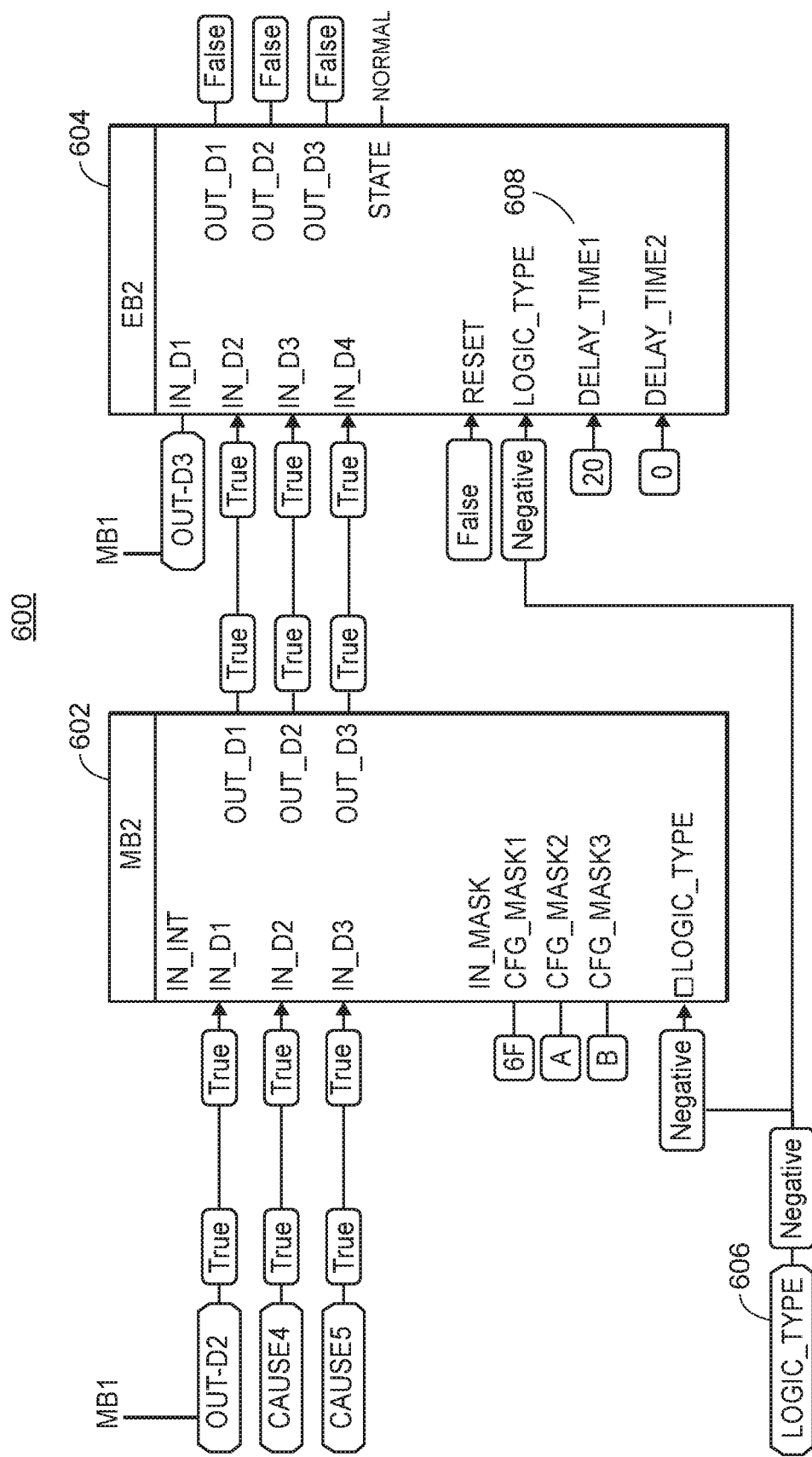
FIG. 6 is an illustration of a second example of a set of function blocks which may be used to implement monitor and effect blocks.

FIG. 6 is another example of an illustration of a configuration screen 600 which may be displayed by a display device and may represent a configuration of monitor and effect blocks. The example of FIG. 6 focuses on monitor block MB2 and the effect block EB2 from FIG. 4. For illustrative purposes, the logic type 606 is set to negative, meaning that all of the causes are "true" when in the normal state. In the negative logic type, when one or more inputs occur the status switches to "False," the corresponding outputs of the monitor block may be set to "False," which the effect block may receive and then trigger the effects setting the effect to "True."

Further, the effect block EB 604 includes time delay inputs 608. In this example, input 1 (IN_D1) of the effect block 604 may cause the output, OUT_D, to be triggered with a delay (DELAY_TIME1) of 20 seconds, as "20" is input to the Delay_Time 1 input of the effect block 604. However, input 2 (IN_D2) of this example may cause the output (OUT_D) to be triggered immediately because the time delay (DELAY_TIME2) is set to zero. This example is not intended to limiting, and any number of delays and delay times may be set for a particular effect block.

As an example, if cause 4 were to occur, the status of cause 4 (and consequently IN_D2) would change to "false." Referring back to FIG. 4, we see that cause 4 corresponds to or effects each of the outputs 411-413 of the monitor block 410. Thus, in this example, cause 4 (and IN_D2) may drive or effect all of the outputs (OUT_D1 through OUT_D3) of MB2 according to the logic implemented by the configuration masks of the monitor block 602. In particular, OUT_D1 of MB2 602 may be set to "False." In turn, IN_D2 of EB2 604 will be received as "False." Thus, the corresponding effects of EB2 604 may be triggered immediately, as the time delay (DELAY_TIME2) corresponding to IN_D2 of EB2 604 is set for zero time delay. As an example, if output 411 of MB 410 of FIG. 4 corresponds to OUT_D1 of MB2 602, then these outputs only drive effect 4 (of CEM 300) which may be represented as OUT_D1 in EB 604. Thus, OUT_D1 of EB 604 may now be triggered and set to "True."

The example monitor and effect blocks provided in FIGS. 5 and 6 are intended to be simplistic for demonstrational purposes. For example, although the monitor block 502 is shown in FIG. 5 to have four inputs and five outputs, other embodiments may include any desired number of inputs and outputs necessary based on the functionality of the monitor block. In one embodiment, the number of inputs IN_Dx and outputs OUT_Dx generally corresponds to the number of inputs and outputs in each logic block of the reorganized CEM. Further, the system may configure the masks so that one monitor block can be implemented to drive or effect a plurality of effect blocks and additional monitor blocks. In turn, the CEM can be separated into a plurality of monitor and effect blocks which may by layered, looped, nested, chained etc., which may provide the system with greater flexibility for configuring the systems of the process control plant than a traditional state machine implementation.

Figure 7:
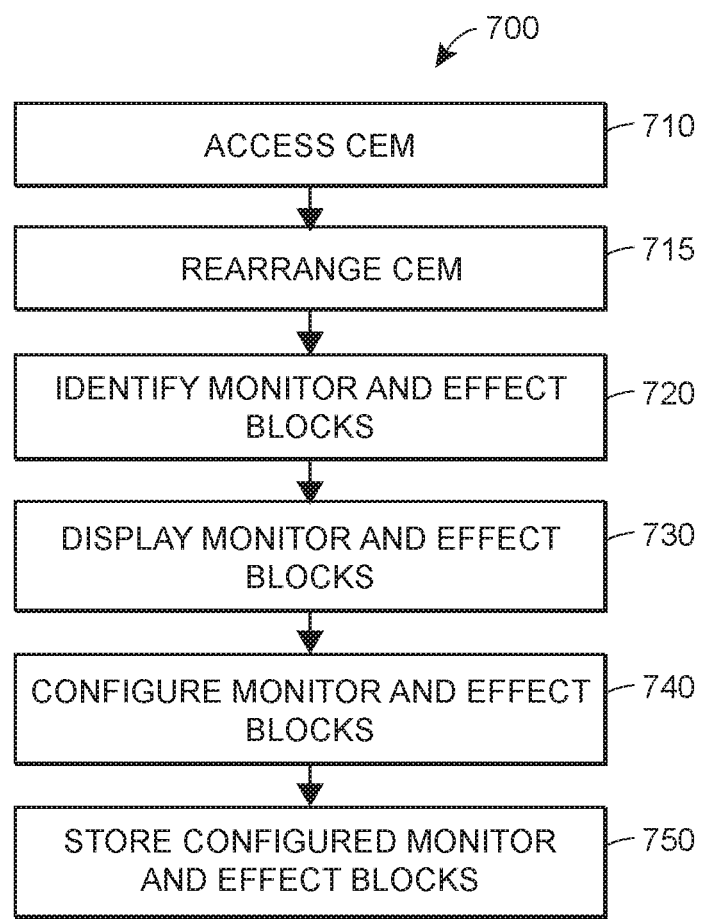
FIG. 7 is a flow diagram of an example method of configuring monitor blocks and effect blocks associated with a process plant.

FIG. 7 is a flow diagram of an example method 700 of configuring monitor blocks and effect blocks associated with a process plant. The method 700 may be implemented periodically and/or in response to a triggering event, for example, such as an indication or initiation signal by a configuration engineer or other user or other safety logic designer. The method 700 may be performed by an electronic device (e.g., the cause and effect analyzer tool 17) that may include one or more components of a process plant, such as the process plant 10 as discussed with respect to FIG. 1.

At a block 710, the electronic device may receive or otherwise access a CEM. In certain embodiments, it may be beneficial to rearrange the CEM to remove sparseness and otherwise collect information in clusters of groups before identifying logic blocks. At a block 715, the electronic device may automatically rearrange and/or enable a user to rearrange the CEM. A method for automatically rearranging a CEM is discussed in greater detail below. At a block 720, the electronic device may identify and create a set of monitor blocks and effect blocks to implement the logic of the CEM. At a block 730, the electronic device may display the monitor and effect blocks to a user, such as a configuration or safety logic engineer who may design the safety or control logic that is to implement the CEM. In particular, the electronic device may cause a display device to display a graphical user interface (GUI), where the GUI may indicate a first monitor block, a second monitor block, and an effect block. Further, each of the first monitor block, the second monitor block, and the effect block may indicate a plurality of cells arranged in a matrix having a first dimension and a second dimension, wherein positions along the first dimension may indicate outputs, and positions along the second dimension may correspond to inputs, such that the plurality of cells may define input/output pairs based on the positions of the plurality of cells relative to the first and second dimensions.

In a block 740, the electronic device may configure or may enable the user to configure the monitor blocks and the effect blocks to implement the logic of the CEM. In an embodiment, the electronic device may enable a user to input configuration data via an input device. In another embodiment, the electronic device may automatically determine or generate the configuration data by parsing the CEM. According to implementations, the electronic device may configure one of the outputs of the first monitor block to serve as one of the inputs of the second monitor block, may configure an additional one of the outputs of the first monitor block and one of the outputs of the second monitor block to serve as inputs to the effect block, and/or may designate at least one of the plurality of cells of each of the first monitor block, the second monitor block, and the effect block as a trigger associated with the respective input/output pair for the respective cell and corresponding to a condition in the process plant.

In an embodiment, to configure the monitor blocks and the effect blocks, the electronic device may incorporate at least one additional monitor block having an additional plurality of cells defining additional input/output pairs, configure at least one output of the additional monitor block to serve as an input to at least one of the first monitor block, the second monitor block, and the effect block, and designate at least one of the additional plurality of cells as an additional trigger associated with the respective additional input/output pair for the respective additional cell and corresponding to an additional condition in the process plant. In another embodiment, to configure the monitor blocks and the effect blocks, the electronic device may incorporate at least one additional effect block having an additional plurality of cells defining additional input/output pairs, configure at least one input of the additional effect block to correspond to an output of one of the first monitor block or the second monitor block, and designate at least one of the additional plurality of cells as an additional trigger associated with the respective additional input/output pair for the respective additional cell and corresponding to an additional condition in the process plant.

Additionally, in an embodiment, to configure the monitor blocks and the effect blocks, the electronic device may configure the inputs for each of the first monitor block and the second monitor block, may configure an input mask for at least one of the first monitor block and the second monitor block, the input mask to be logically associated with the inputs of the at least one of the first monitor block and the second monitor block, may designate at least one of the triggers as a time-delay trigger to cause the associated effect to activate with a time delay, and/or may designate at least one of the triggers as a permissive trigger.

In a block 750, the electronic device may store the configured monitor blocks and effect blocks. In particular, the electronic device may store the configuration data on a computer readable medium associated with the first monitor block, the second monitor block, and the effect block. In an embodiment, the electronic device may further display, on the display device, the plurality of cells for each of the first monitor block, the second monitor block, and the effect block, and may indicate the respective trigger within the respective plurality of cells.

Of course, the method 700 may create any number of monitor and effect blocks connected together in any numbers of ways to implement the logic of a CEM using these interconnected monitor and effect blocks. Each monitor block may include any number of or any subset of the causes of the CEM as inputs thereto and may include inputs tied to outputs of other monitor blocks there thereby effect cascaded monitor blocks. Moreover, any effect block may determine one or more effects from a set of inputs and may receive, as inputs, any of the outputs of the monitor blocks and/or any cause inputs. Still further, the method 700 may interconnect or enable a user to interconnect (i.e., define the connections between) the various monitor blocks and the other monitor blocks and the effect blocks. As such, each monitor block includes logic that determines one or more intermediate logic conditions or signals based on one or more of the cause signals (input to the monitor block either directly or in the form of another intermediate logic signal developed from cause signals input into another upstream monitor block). Likewise, each effect block produces one or more effect signals based on a set of inputs thereto, with such inputs being cause signals and/or intermediate logic signals output from one or more of the monitor blocks. In this manner, the method 700 enables an intermediate logic signal to be developed in one or more monitor blocks that represents some logical combination of cause signals and to provide or use this intermediate logic signal as inputs to one or more effect blocks, to thereby simplify the configuration, size, and logic implemented by the effect blocks to create effect signals.

For smaller CEMs, it may be possible for a safety engineer to manually rearrange and/or configure the CEM at the block 715 of the method 700, such as by identifying patterns or by attempting to group causes and effects which are related. Such rearranging may be implemented manually via the graphical user interface by a user moving or rearranging various rows and/or columns of the CEM around to group the cells that define cause and effect relationships (e.g., the cells marked with an X) to be close to one another or to form more dense groupings. However, there are multiple ways to reorganize larger CEMs, and it is beneficial to identify the best option for reorganization. Accordingly, there is an opportunity to dynamically and automatically analyze and reorganize CEMs associated with a process control system.

In an embodiment, the system (i.e., the computer system of FIG. 1) may implement the cause and effect analyzer tool 17 to automatically reorganize a large CEM based on a set of rules. In an embodiment, the rules 31 may be stored in the configuration database 32 of FIG. 1 and/or may be received via the user interface of the workstations 18*a* and/or 20*a*. The analyzer tool 17 may analyze a CEM to determine the most appropriate or optimized configuration of the CEM (i.e., the best manner of rearranging the CEM to produce a set of monitor and effect blocks) given the set of rules 31. The set of rules 31 may be specified by an engineer, or otherwise automatically generated by a computer such as the analyzer tool 17, based on the current needs or configuration of the particular process plant. For example, the set of rules 31 may indicate that the CEM should be organized into groups, with certain causes and/or effects grouped together based on the corresponding logic solvers 50, MPD 70 and/or field devices 22, 23, 24, 60, and 62, in which this logic is to be implemented. Further, the set of rules 31 may indicate that the CEM should be reorganized to remove sparseness, based on particular patterns, based on efficiency of the system, and/or based on other criteria. In another embodiment, the set of rules 31 may indicate that certain causes and/or effects (or groups of causes and/or effects) are not to be moved. In still another embodiment, the set of rules 31 may indicate weights for particular causes and/or effects that need to be reorganized which weights are used to resolve conflicts when trying to apply multiple rules which lead to different results.

In an embodiment, the set of rules 31 may indicate that the CEM is to be reorganized into a particular number of groups and/or groups of a particular size. The set of rules 31 may further indicate the manner in which the groups are to be organized. For example, the set of rules 31 may indicate that each group should contain a certain number, a certain maximum number or a certain minimum number of causes and/or effects. In an embodiment, the set of rules 31 may indicate that groups should not contain overlapping causes and/or effects. The rules 31 may also specify that certain causes or effects should be grouped together because, for example, these causes will be detected by a particular logic solver or in a particular node or the effects may need to be implemented by a particular logic solver at a particular node. In any event, once a CEM is reorganized, the set of rules 31 may further enable an engineer to manually configure particular causes and/or effects in the CEM. It should be appreciated that alternative or additional rules are envisioned.

In an implementation, an analyzer tool may receive or generate a set of rules 31 indicating that only certain causes and/or effects corresponding to certain areas of the process plant should be reorganized or that these causes and effects should be reorganized together or as a group. Similarly, the set of rules 31 may indicate that only a certain subset of the causes and effects of the CEM should be reorganized. The analyzer tool may also receive or generate a set of rules 31 "locking" certain rows and/or columns to prevent moving the received rows and/or columns during reorganization. Still further, the analyzer tool may receive or generate a set of rules 31 that indicate that causes corresponding to positive logic (i.e., if the cause is "on" then the effect is activated) should be grouped together and causes corresponding to negative logic (i.e., if the cause is "on" then the effect is not activated) should be grouped together. Other manners of grouping or reorganizing the CEM rows and columns based on the type of logic defined in the CEM cells (i.e., the type of logic to be implemented) may be used as well.

Figure 8:
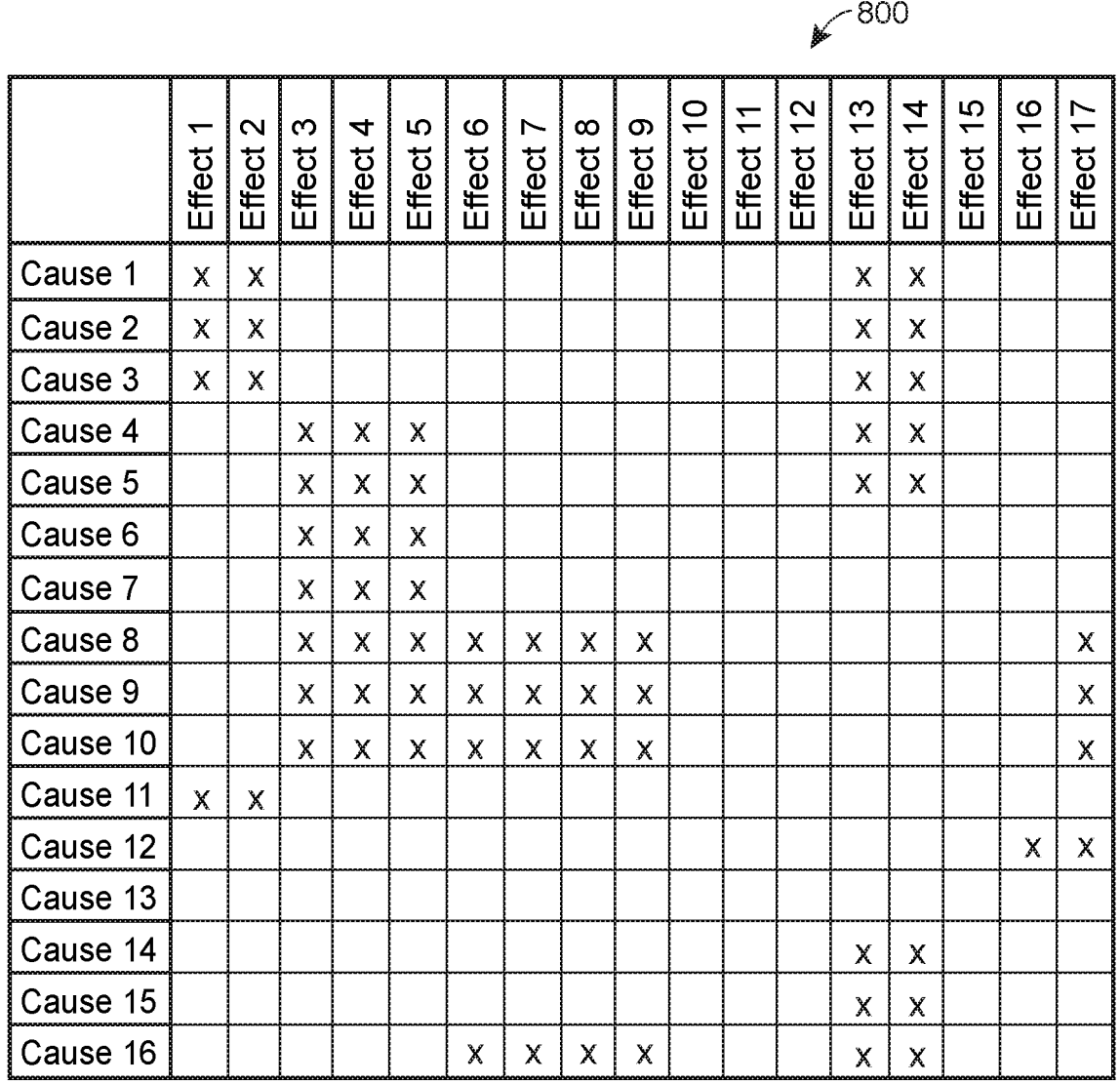
FIG. 8 is an illustration of a second example of a cause and effect matrix.

In turn, the reorganization of the CEM may require a multi-part analysis that may be implemented by a computer and that may be based on the set of rules 31. The computer may analyze the CEM by row, by column, by group, by trigger, based on the corresponding logic solvers 50, MPD 70 and/or field devices 22, 23, 24, 60, and 62, or by any other element best suited to implement the set of rules 31. For example, FIG. 8 is an example CEM 800 which is much larger than the previous example CEM 300 of FIG. 3. The CEM 800 contains a number of populated cells that are scattered throughout the matrix. Although the CEM 800 is only slightly larger than the CEM 300, it is clear that the problem of identifying logic blocks or logical groups in the CEM 800 to be implemented by sets of monitor and effect blocks is increasingly more complex. Further, the CEM 800 includes populated cells that are scattered from the larger groupings, which adds to the difficulty of efficiently selecting logic blocks to be used to generate monitor and effect blocks. For CEMs of increasing size, the difficulties of manually selecting or defining logic blocks grows immensely.

FIG. 9 illustrates one example of a display depicting a CEM 900, which is a reorganized version of the CEM 800 from FIG. 8. As illustrated in FIG. 9, the CEM 900 has been organized to include three primary groups or logic blocks: 901, 902, and 903. In an example embodiment, the logic blocks 901, 902, and 903 may each correspond to a particular logic solver 50 within the process plant. In another embodiment, the computer may have identified the logic blocks 901-903 based on criteria defined within the set of rules 31.

For example, the logic block 901 of FIG. 9 may correspond to a set of effects that all belong in a certain physical location of the process plant (e.g., a particular heating section) or that will be implemented by the same controller or logic solver in the plant control system. Further, the logic block 902 may result from the analyzer tool removing sparseness from the CEM by recognizing a group in which all the causes are related to all the effects. In particular, in the logic block 902, each of the causes 4-10 is paired with each of effects 3-5. The logic block 903 may correspond to a group of negative logic cause and effect relationships. Although the example CEM 900 contains three logic blocks, the CEM can be broken up into any number of logic blocks, and based on any of the rules 31, or any combination or rules 31, described above or any other rules not mentioned above which may be used by the analyzer tool 17 when analyzing and reorganizing a CEM. The logic blocks 901, 902, and 903 may each be used to define a set of interconnected monitor and effect blocks to implement the logic of these portions of the CEM, as described above with respect to FIGS. 3 and 4.

Figure 10:
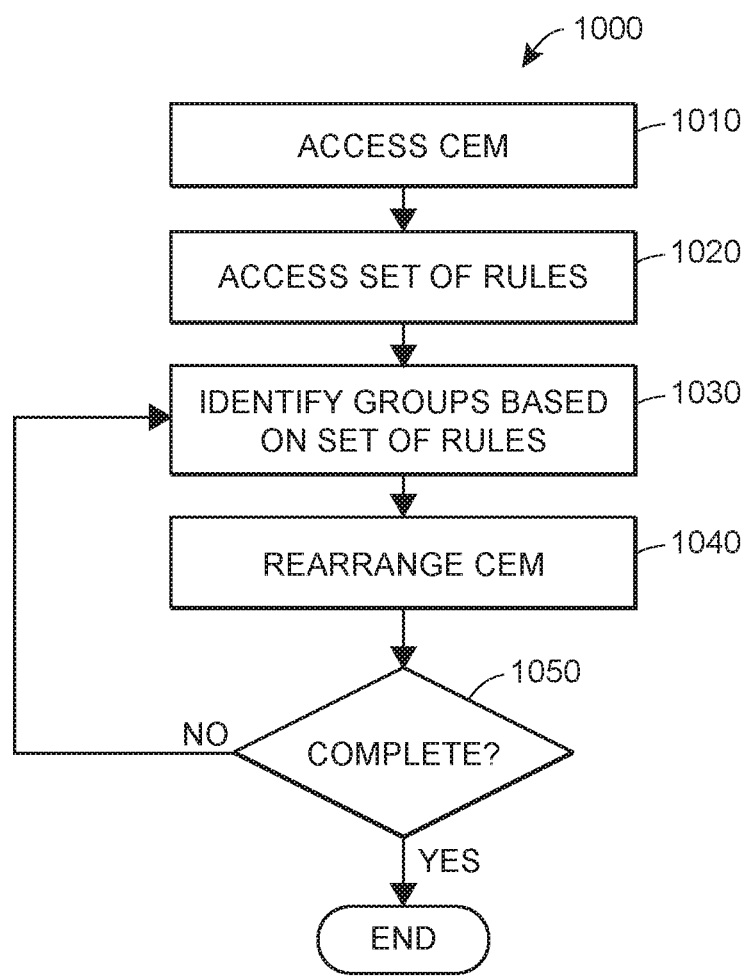
FIG. 10 is a flow diagram of an example method of reorganizing a cause and effect matrix.

FIG. 10 is a flow diagram of an example method 1000 of rearranging a cause and effect matrix and defining and/or managing logic blocks of a CEM to be used in developing safety or control logic of a process control system. The method 1000 may be implemented periodically and/or in response to a triggering event, for example, such as during configuration of the plant, whenever the CEM for the logic is changed or updated, etc. The method 1000 may be performed by an electronic device (e.g., the analyzer tool 17 of FIG. 1) that may include one or more components of a process plant, such as the process plant 10 as discussed with respect to FIG. 1. At a block 1010 the electronic device may access an initial cause and effect matrix having a set of inputs and a set of outputs (i.e., a set of causes and a set of effects). In embodiments, each of the set of inputs may represent a condition within the process plant and each of the set of outputs may represent an effect to be performed within the process plant. Further, at least some of the set of inputs and the set of outputs may be related as cause-effect pairs whereby the corresponding effect may activate in response to an occurrence of the corresponding condition. The initial cause and effect matrix (CEM) may be stored in a data repository in the process control plant or may be generated by a user at the electronic device for configuring a new process in the plant. The initial CEM may also be received from a database outside of the process control system. In some embodiments, the initial CEM may only be accessed by an engineer with the proper credentials, and thus a log-in or other password may be required to authorize access to the initial CEM.

The electronic device may define each of a set of related groups within the initial CEM. In particular, at a block 1020, the electronic device may access a set of rules 31 associated with the set of related groups. In particular, the electronic device may access the set of rules 31 through one or more databases either inside or outside the process control system. The electronic device may also receive the set of rules 31 as inputs provided by an engineer of the process control plant. Further, the set of rules 31 may be a combination of various rules accessed through various databases and/or inputs. The set of rules 31, as discussed in great detail above, may be aimed to reorganize the CEM in an efficient and effective manner.

In one embodiment, a rule may specify that a specified portion of the set of outputs must be within the same related group. In another embodiment, a rule may specify that the portion of the set of inputs must number a certain amount. In a further embodiment, a rule may specify that neither the set of inputs nor the set of outputs should overlap among the set of related groups. Of course, any other desired rules could be used.

At a block 1030, the electronic device may identify a portion of the set of inputs (causes) that are related to a portion of the set of outputs (effects) according to the set of rules as defined by the corresponding cause-effect pairings defined in the CEM. Further, at a block 1040, the electronic device may rearrange the portion of the set of inputs and the portion of the set of outputs such that the portion of the corresponding cause-effect pairs are rearranged. The block 1040 may perform this rearranging to define one or more function block logic units that will be implemented using a set of monitor and effect blocks, as defined above. A block 1050 may analyze the rearranged CEM and decide if the process is complete and, if not provide control to the block 1030 to identify other rules to be used to rearrange the CEM further in an effort to optimize the creation of monitor and effect blocks based on the rearranged CEM. Moreover, the block 1050 may, when rearranging is complete, define logic blocks or groups of logic within the rearranged CEM, such as the three logic groupings 901, 902 and 903 of FIG. 9.

In an implementation, the electronic device may further configure one or more function block logic units for the process control system according to the set of related groups defined by the block 1050. Additionally or alternatively, the electronic device may, for each related group of the set of related groups, automatically calculate a numerical representation for the related group or for a portion of a related group according to the rearranged cause-effect pairs, such as by calculating a hexadecimal representation for the related group, discussed in greater detail below with respect to FIGS. 11-12.

Once the analyzer tool has reorganized the CEM 900, the system may further break down the CEM 900 into separate logical groups to further improve efficiency in creating monitor and effect blocks that implement those logical groups. FIG. 11 depicts an additional representation of the CEM 900 of FIG. 9. In particular, the system may analyze the CEM 900 of FIG. 9 to produce various numerical representations 1101, 1102, and 1103 which the system may use to configure the function blocks as a set of interconnected monitor blocks and effect blocks. In an embodiment, the numerical representations 1101-1103 may each represent or define an output or effect as a value, such as a hexadecimal value, based on the configuration of the logic relationships defined by the cause and effect pairs as defined by the rearranged CEM 900. This numerical value is in contrast to conventional systems which represent each column as a logical expression. However, such conventional systems are inefficient due to the difficulty of implementing or understanding logical expressions.

In an embodiment, the system may devise numerical representations by assigning each cell in the matrix one of two values (e.g., ON or OFF, 1 or 0, etc.) and then converting each bit group (e.g., a four digit binary number) of a row or a column of the CEM into a hexadecimal digit. For example, as illustrated in FIG. 11, numerical representation 1101 for the Output 14 is the hexadecimal representation (FE08) of the cells associated with the Output 14, in which an X in a cell is treated as binary "1" and an empty cell is treated as a binary "0". This calculation can be demonstrated by breaking up the Output 14 into 4 bit groups (which are delineated by thicker lines between the cells and which make up the four bit numbers, from top to bottom: 1111, 1110, 0000, 1000) and then converting each bit group into a hexadecimal digit. In this case, the numerical representation 1101 of Output 14 is FE08 because in hexadecimal digits, F=1111, E=1110, 0=0000, and 8=1000. In the same manner, the numerical representation 1102 (07E0) corresponds to Output 5 because, from top to bottom, Output 5 can be broken down into bits 0000, 0111, 1110, 0000, which translates into the hexadecimal number 07E0. In a similar manner, the Output 17 can be represented as the hexadecimal number 0072, (numerical representation 1103). The example numerical representations are not intended to be limiting and some or all of the columns and/or rows may be assigned a numerical representation. Further, the numerical representation does not necessarily have to be a hexadecimal conversion and can be made in any other suitable form.

There are many benefits to devising numerical representations for certain groupings of the logic cells within a CEM.

In particular, compared to conventional systems, the column-to-hex conversion is simpler, does not require additional gates or programming to generate an expression, takes less memory to store, and takes less bandwidth to communicate to the function block input. Moreover, the hexadecimal value inputs may be more easily error corrected as desired to ensure accuracy, discussed below with respect to the test matrices of FIG. 15.

The numerical representations may further enable the system to configure the cause/effect relationships of the safety system configuration environment. In particular, the numerical representation may enable the system to define relationships among a large number of causes and effects. Further, the numerical representation may help eliminate configuration error by distilling entire rows and/or columns into a single numerical value. Additionally, the numerical representation may provide a simple and efficient way to identify changes in the cause/effect relationships and further reduce the effort necessary for managing changes in the CEM.

For example, the numerical representations may be implemented as configuration masks in function blocks, such as the monitor and effect blocks of FIGS. 4-6. Thus, these numerical representations may actually identify the logic to be implemented for a particular effect in a monitor and/or an effect block. The numerical representations may define which inputs correspond to each particular output and thus disassociate (i.e., mask) the inputs which do not correspond to the particular output. For example, numerical representation 1101 of effect 14 in FIG. 11 may disassociate all of causes 6-13 from effect 14. In other words, a monitor block may receive all of causes 1-16, but if implementing numerical representation 1101 as a mask, would only correlate causes 1-5 and 14-16 to effect 14.

Moreover, the system may adapt the numerical representations when the range of possible cell values are more than two (e.g., when the cells can define multiple different triggers such as no value, an X, a T (indicating a time delay), a P (indicting a permissive cause), etc. For instance, for an example range of four possible intersection values, the system may perform two hex conversions to generate the resultant numerical representation. In other words, the four possible different values of each cell can be represented as one of four possible values of a two bit number, meaning that each cell would be defined by a two bit value instead of a one bit value as indicated in FIG. 11. In this case, each set of two adjacent cells of the string would form a four bit value that can be converted to a hexadecimal number. As a result, the numerical representation in this scenario would be twice as long as that shown in FIG. 11 but would be more dynamic as it could represent a greater number of potential logical expressions to be used in the logic that implements the CEM. Alternatively, the system may calculate the numerical representation using a suitable base other than base 16, and may then optionally convert (if desired) the numerical representation into a hex input value for the function block (i.e., the monitor and effect blocks).

Figure 12:
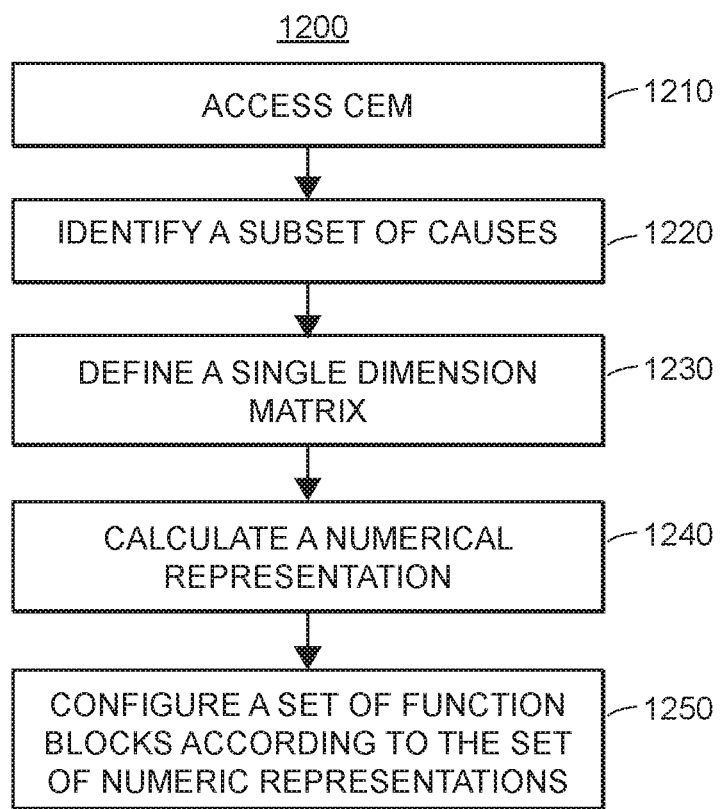
FIG. 12 is a flow diagram of an example method of calculating numerical representations for cause and effect matrix logic.

FIG. 12 is flowchart of an example method for creating/calculating numerical representations of values or elements within a CEM. At a block 1210, the cause and effect analyzer tool 17 may access a CEM. In an example embodiment, the CEM may be rearranged before continuing. At a block 1220, the tool 17 may identify a subset of causes. In an embodiment, the subset of causes may belong to a particular logic block and/or be defined by a set of rules, as described above. Next, at a block 1230, the tool 17 may define a single dimension matrix for the subset of causes. The single dimension matrix may correspond to a particular effect of the CEM. Next, at a block 1240, the tool 17 may calculate a numerical representation of the single dimension matrix. As described above, the tool 17 may convert the single dimension matrix into a binary string and/or multiple binary strings. In an embodiment, the tool may then proceed to convert the one or more binary strings into a hexadecimal representation, or any other suitable numerical representation. The calculated numerical representations may be stored as numerical representations 33 in a repository, such as configuration database 32 of FIG. 1.

At a block 1250, the numerical representations 33 may then be used to configure a set of function blocks (e.g., monitor and effect blocks). For example, as described above, the numerical representations 33 may be implemented as configuration masks in one or more monitor blocks.

Figure 13:
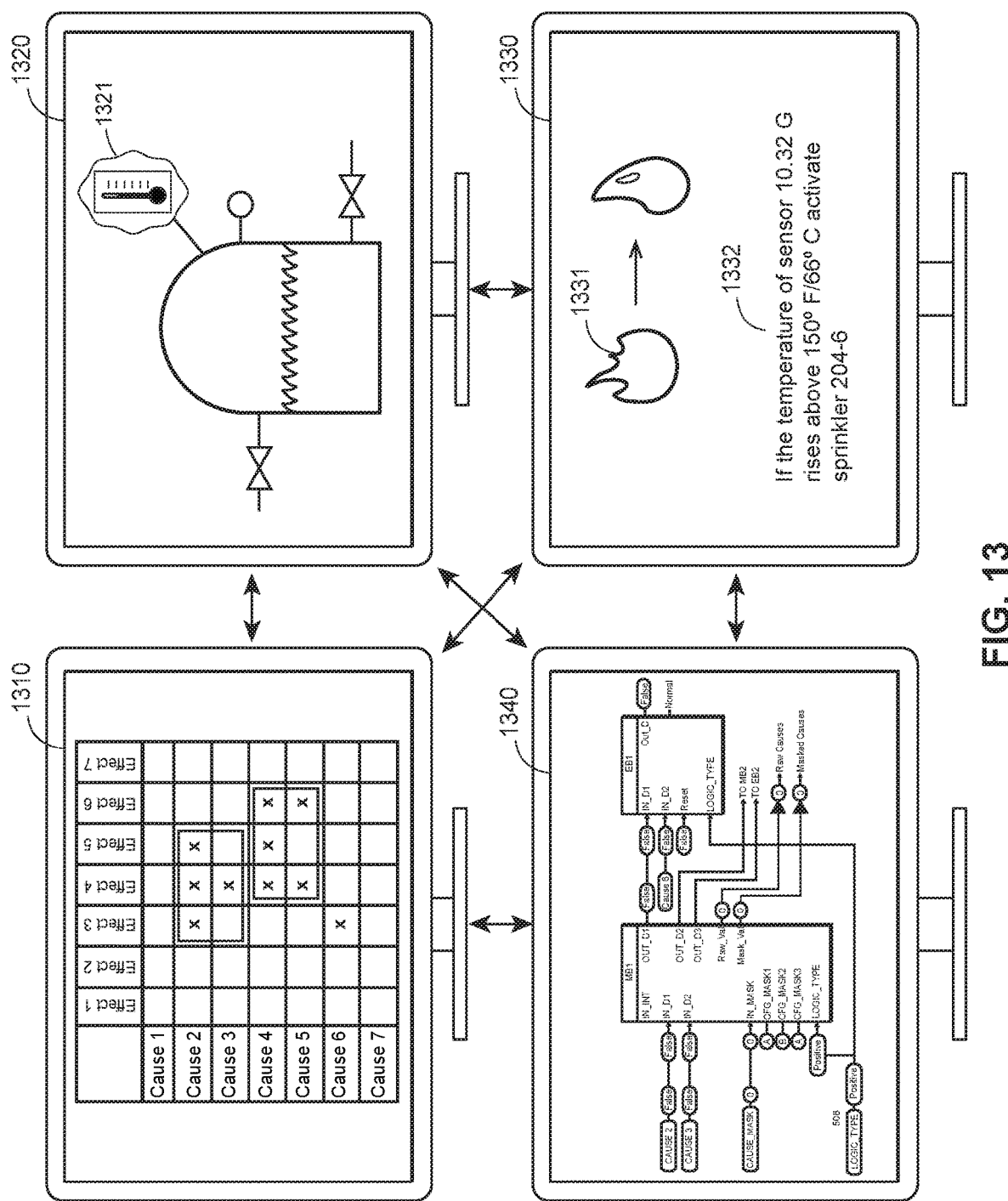
FIG. 13 is an example illustration of various interlinked user interfaces corresponding to the safety logic of a cause and effect matrix.

In another aspect of the system described herein, the system navigator application provides the user with the ability to quickly navigate between different user interface screens which provide relevant safety information for the process plant. Such information can be found in CEMs, monitor and effect blocks, safety documents, and system configuration displays. In some embodiments, these different user interfaces provide different visual representations of the same safety logic. Thus, the current invention provides the navigator tool 15 (of FIG. 1) to navigate between an interlinked set of user interfaces. For example, FIG. 13 is an example illustration 1300 of a set of user interfaces which are interlinked.

In some example process plants, the safety protocol is programmed in one of several languages. Regardless of the programming language, the starting point of the safety protocol is normally a narrative document that specifies the requirements for the control and/or safety actions of the process plant. In other example process plants, such as safety instrumented systems (SIS), the safety requirements are documented in a document known as the Safety Requirement Specification (SRS).

One of the inputs for the SRS is the list of identified Safety Instrumented Functions (SIF). Each SIF protects against a specific hazard and provides a defined level of risk reduction. A SIS is made up of one or more SIFs. In some embodiments, some safety systems combine all the SIFs in the SIS configuration with no distinction of each individual SIF. Further, some safety systems follow an SIF approach and allow SIF-based SIS configuration.

The SRS normally includes different sections. One of the sections is the logic description which could be represented by either plain text, logic diagrams or Cause-and-Effect diagrams (i.e., Cause and Effect Matrices). As mentioned, some safety systems combine all SIFs in the SIS configuration and the CEM visualization may be very convenient in implementing such embodiments.

In one embodiment, the navigator application 15 may allow an engineer to select a given cause (and/or effect) within a CEM to navigate to particular documents describing the selected cause (and/or effect). For example, selecting a cause may redirect to the particular SIF description in the SRS. This feature allows the engineer to view the particular safety logic associated with the cause and/or effect. In an embodiment, the engineer may also be able to select a safety module (system configuration) associated with a given SIF and then may be re-directed to a user interface displaying the proper SIF from the CEM. Further, the engineer may select an element of the CEM and be redirected to a display of a system configuration highlighting devices, logic blocks, function blocks, monitor and effect blocks, etc., related to the particular element of the CEM. From the safety or control module, the user can also be re-directed to the proper section on either the SRS or control narratives. In other words, the current system may allow an engineer to seamlessly switch between views of a CEM, an SRS or a system configuration.

For example, if an engineer selects a cause and/or effect in a user interface of FIG. 13 displaying a CEM 1310, the engineer may be redirected to a display screen 1320 illustrating a system configuration including particular devices related to the selected cause and/or effect of the CEM. For example, the system configuration 1320 may include symbols for tanks, valves, transmitters, pumps, pipes, sensors, etc. related to selected causes and/or the effects of the CEM. In this example, a thermometer icon 1321 is highlighted, indicating that the selected cause and/or effect corresponds to a temperature sensor reading.

Further, either from the CEM 1310 or the system configuration 1320, an engineer may access a document describing the safety protocol of the process plant, such as the SRS 1330. FIG. 13 illustrates an example display 1330 of a portion of a safety requirement specification including icons 1331 and text 1332 describing relevant safety procedures. The navigator application 15 allows an engineer to toggle between displays, providing the engineer with information and insights that were previously cumbersome to access. Further, from any one of interface 1310, 1320 and/or 1330, the user may access a user interface 1340 displaying a set of monitor and effect blocks (or other function blocks or logic) including the logic that implements the relevant selected element (e.g., of the CEM 1310).

In an example embodiment, an engineer may right-click on the element of the CEM 1310 (or SRS 1330, system configuration 1320, or monitor and effect blocks 1340) to access a drop down menu. The drop down menu may provide the engineer with options including the ability to access one of the other display views (such as 1310, 1320, 1330 and 1340) and/or other views (as described with regard to FIGS. 16A-D below).

User can easily navigate from the CEM 1310 (or from individual cells, causes or effects of the CEM 1310) or the system configuration 1320 to specific section(s) within requirement specifications (SRS 1330) such as the definition for the general bypass philosophy, proof testing requirements, etc.

This functionality will provide seamless transition back and forth between configuration and design documents to facilitate configuration verification, management of change, troubleshooting and proof testing.

Figure 14:
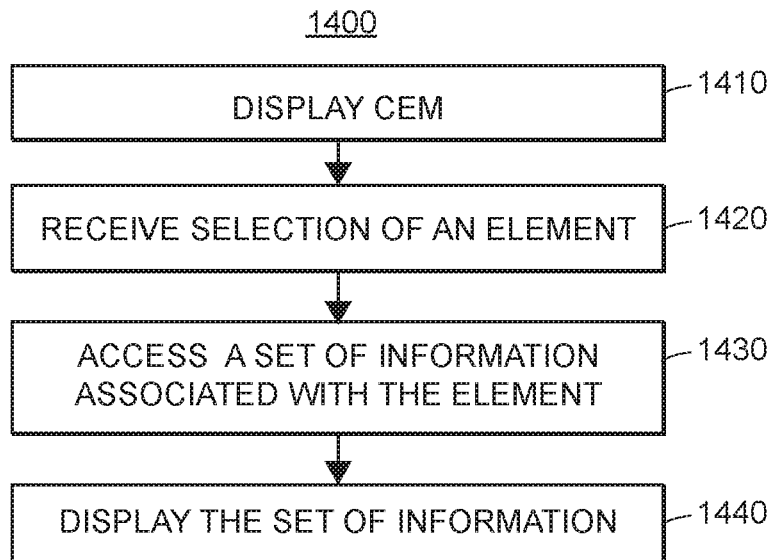
FIG. 14 is a flowchart of an example method for navigating between the interlinked user interfaces of FIG. 13.

FIG. 14 depicts is a block diagram of an example method 1400 of enabling access to information included in a safety requirement specification (SRS) for a process plant controlled by a process control system. The method 1400 may be facilitated by a server or otherwise any type of electronic device, where the server may be equipped with or connected to a user interface configured to display content. The SRS may be stored in memory that may be accessible by the server.

The method 1400 may be begin at block 1410 at which the server may display, in the user interface, a CEM. In embodiments, the (CEM) may include a set of elements including a set of causes and a set of effects, wherein each of the set of causes may represent a condition within the process plant and each of the set of effects may represent an effect to be performed within the process plant. Further, at least some of the set of causes and the set of effects may be related as cause-effect pairs whereby the corresponding effect may activate in response to an occurrence of the corresponding condition.

At a block 1420, the server may receive, via the user interface, a selection of an element of the set of elements. In particular, the server may receive a selection of a cause of the set of causes or a selection of an effect of the set of effects. In response to receiving the selection, at block 1430, the server may access, from the SRS, a set of information associated with the element of the set of elements. In particular, the server may access, from the SRS, a set of information associated with the selected cause or the selected effect. According to embodiments, the server may access, from the SRS, a piping and instrumentation diagram (P&ID) associated with the selected element, a safety instrumented function (SIF) description associated with the selected element, or other information.

At a block 1440, the server may display the set of information in the user interface. In an embodiment, the server may also initiate an application configured to display, via the user interface, safety logic associated with the selected element. Additionally, in an embodiment, the server may receive, via the user interface, an additional selection of a portion of the set of information displayed in the user interface, access, from the SRS, an additional set of information associated with the portion of the set of information, and display the additional set of information in the user interface. Moreover, in an embodiment, the server may receive, via the user interface, an additional selection of a portion of the set of information displayed in the user interface, where the portion of the set of information may correspond to an additional element of the set of elements of the CEM, and may display, in the user interface, the CEM and an indication of the additional element.

In some embodiments, large CEMs may contain thousands of cause and effect pairs. Consequently, these large CEMs may be broken down into hundreds of monitor blocks, effect blocks, and numerical representations. Due to the large amount of information scattered over numerous data structures, it may be impossible for a user to manually check that the safety logic of the process control system is being accurately implemented. Previous process control systems lacked the means for rigorously verifying that a configured process control system met the required safety protocols. In other words, previous systems had no manner of testing the accuracy of the CEMs and function blocks which were being implemented to manage the safety of the process plant. The current disclosure provides a tool (e.g., the cause and effect analyzer tool 17) which may automatically verify the safety logic currently implemented in the process plant.

In one aspect, the cause and effect analyzer tool 17 may automatically traverse through the configuration of the process plant (or portion thereof) to generate one or more test CEMs of the as-built or as-configured system. In an embodiment, the tool 17 may construct the test CEM through reverse engineering based on the function blocks (i.e., the monitor and effect blocks) and the numerical representations which represent the currently implemented safety logic of the process plant. The test CEM may then be compared to a requirement defining CEM (a CEM that is known to be an accurate representation of the safety logic required by the process plant). The comparison may reveal and discrepancies or other errors which may then be presented to a user.

Figure 15:
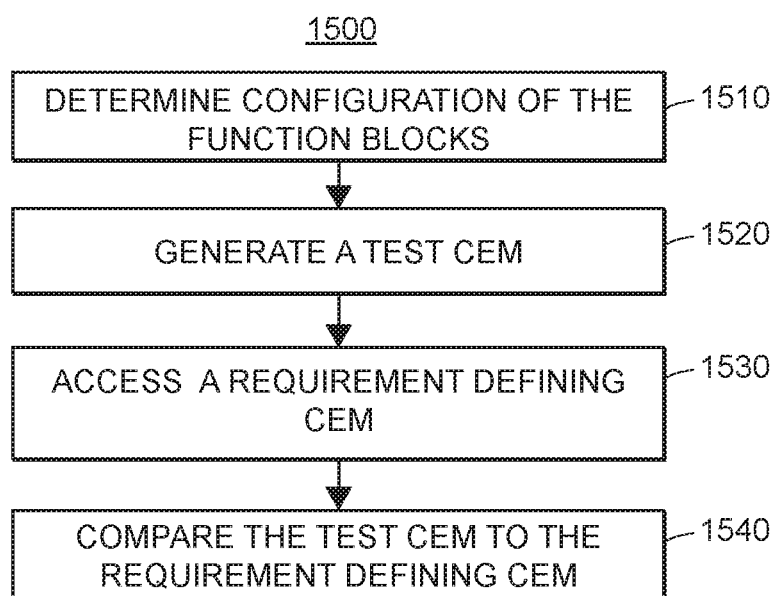
FIG. 15 is a flowchart of an example method for reverse engineering a test cause and effect matrix.

FIG. 15 is a block diagram of an example method for verifying the safety logic of a cause and effect matrix. At a block 1510, the analyzer tool 17 may determine the configuration of one or more function blocks representing the safety logic of the cause and effect matrix. In an embodiment, the function blocks are monitor and effect blocks including inputs, outputs, and numerical representations, as described above. The cause and effect analyzer tool 17 may traverse the inputs and outputs of the monitor and effect blocks (MEBs) while considering a number of factors, such as the logic implemented in the MEBs and/or the numerical representations of the MEBs to determine a configuration of the MEBS. For example, the tool 17 may receive a set of monitor and effect blocks as described in FIGS. 5 and 6 above. The tool 17 may begin at the outputs of the effect blocks and traverse through the inputs of the effect blocks to the source of the inputs (i.e., causes that feed directly into the effect blocks and/or outputs of monitor blocks). The tool 17 may then trace the outputs of the monitor blocks to the corresponding inputs of the monitor blocks based on the numerical representations. The tool 17 may continue this process of traversing the MESs iteratively for each effect until each the relationship of each cause and effect pair has been identified.

At a block 1520, the tool 17 may generate a test CEM based on the determined configuration. The tool 17 may populate the test CEM with the identified cause and effect pairs based on the determined configuration of the monitor and effect blocks. Once the test CEM has been created, the tool 17 may store the test CEM 37 in a data repository (such as configuration database 32 of FIG. 1). The test CEM 37 may be implemented as any of the CEMs described herein.

At a block 1530, the tool 17 may access the requirement defining CEM. In one embodiment, the requirement defining CEMs 35 may be stored in a data repository (such as the configuration database 32 of FIG. 1). In other embodiments, the tool 17 may create the requirement defining CEMs based on the current configuration of the devices in the process plant and the SRS and other safety documents. In an embodiment, the requirement defining CEM 35 may include a set of causes and a set of effects, where the relationships of the cause and effect pairs are based on the safety requirements of the process plant. The requirement defining CEM 35 may be implemented as any of the CEMs described herein.

At a block 1540 the tool 17 may compare the test CEM 37 with the requirement defining CEM 35 to determine if there are any discrepancies. The discrepancies may include any differences between cause and effect pairs from test CEM 37 to the requirement defining CEM 35. For example, the cause and effect pairs may not be correlated by the same trigger type (e.g., permissive, immediate, delayed) and/or the same logic type (AND/OR).

The tool 17 may display any of the one or more determined discrepancies. In an embodiment, the tool 17 may highlight the discrepancies in any of the user interfaces as described in FIGS. 13 and 16*a-d*. In other words, the tool 17 may highlight where the incorrect logic is being implemented in either the CEM, the monitor and effect blocks, a SRS document and/or a system configuration user interface.

Further to the functionality discussed above with respect to FIGS. 13 and 14, it may also be beneficial to see the status history of one or more devices, causes and/or effects in the process plant. Another aspect of the current invention provides user interface views for monitoring the safety system status of a process control system which statuses are typically based or "keyed" on physical equipment and/or safety test results and which may illustrate the present and past states of various causes or effects to provide the user with some ability to see when and how the CEM logic is being implemented in the plant. For example, an engineer may bring up a view (as discussed above with respect to FIG. 13) displaying a particular device or piece of equipment, or group thereof, which may then be used to further access a display view which presents the current and/or past safety status of each piece of monitored device/equipment, cause signal, effect signal, etc. indicated thereon (e.g., FIGS. 16A-D). Additionally or alternatively, a safety engineer may run a safety test on a particular physical device/piece of equipment in the plant, and the results may be displayed on a display view (e.g., FIGS. 16A-D). Previous systems did not allow for an engineer to quickly monitor and assess the overall safety status of the plant (or of a desired area of the plant) without having to access numerous different display views of physical devices/equipment or by having to run particular diagnostics to obtain test results. Not only were the previous systems inconvenient for the engineer, but during an emergency situation, precious time is lost while the engineer is forced to wade through multiple views or run tests in order to obtain or find the status data in which he or she is interested.

The system and methods described herein provides an easily accessible display view of the current status and/or change of status of monitored safety events (rather than of particular devices, equipment or test results). The system aggregates system-wide or area-wide safety event/input status onto a single display view or visualization, capturing changes in safety event status over time, and linking visualized safety events on the overall safety display view to devices/equipment/test results.

A "safety event" is a logical representation of a monitored condition. In an example embodiment, each monitored input (cause) of a CEM could be a monitored safety event. Additionally, each effect could be a monitored safety event. The respective status and/or respective change in status of each safety event that is desired to be monitored is represented by a different object/item/graphical item on the safety event visualization view. For example, each monitored event could be presented by a colored dot, with different colors signifying different current statuses (e.g., red—bad, blue—caution, black—OK). Additionally or alternatively, a change in current status (either binary and/or by degree of change) could be represented, e.g., by different colors or representations. Such statuses and/or changes in statuses may be captured over time and saved. In fact, the display view could provide a rolling snapshot of time for monitored events, and may include different sections for safety events that are monitored at different rates (e.g., every 2 minutes, every 20 minutes, every 2 hours).

Figure 16A:
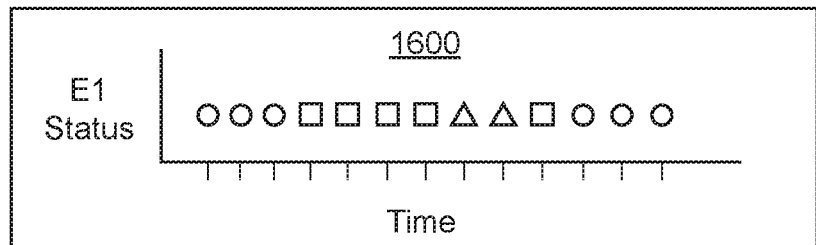
FIGS. 16A-16D are illustrations of example user interfaces displaying a monitored safety event.
Figure 16B:
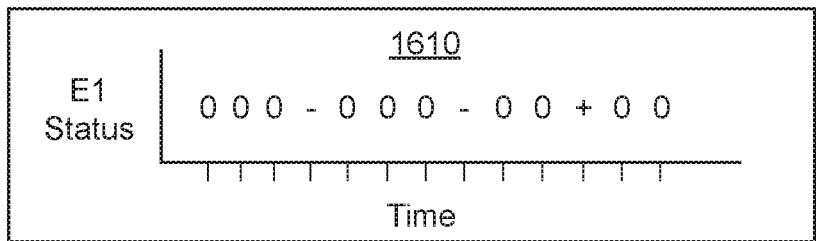
Figure 16C:
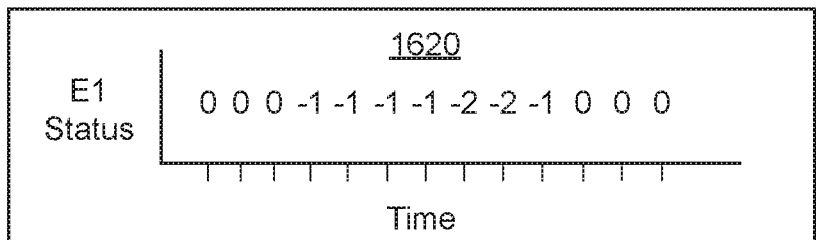
Figure 16D:
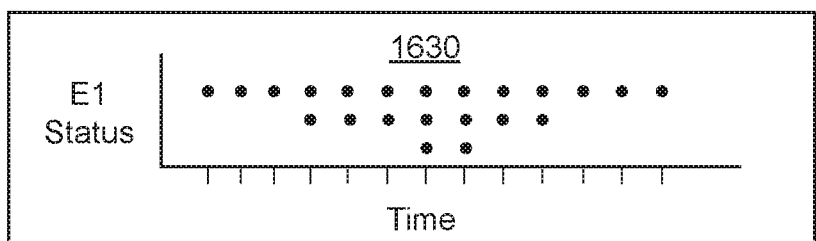

FIGS. 16A-D are example illustrations of the change in status of a safety event over time. In FIGS. 16A-D, an event E1 is a monitored safety event. The current safety status of E1 over time could be represented as a running line of shapes along a time axis on a display view, with each shape representing a different status (as depicted in FIG. 16A). In the graph 1600, the circle represents a normal status, the square represents a cautionary status, and the triangle represents a dangerous status. Alternatively, a change in the E1 safety status over time could be represented based on the point in time when the change occurs. For example, in FIG. 16B, the graph 1610 illustrates a steady state (or no status change) with a "0," a decrease in safety status with a "−," and an increase in safety status with a "+." It should be appreciated that the safety statuses and changes therein may be indicated in any type of numerical or graphical form. FIG. 16C illustrates a graph 1620 that displays the status as a number, where each negative increment from 0 represents an additional status degradation. If desired, a degree in change of safety status may be represented. For example, the y-axis of the graph could indicate a range of degradation off of normal, and the safety status over time could look like a line graph, or the dotted bar graph 1630 of FIG. 16D. Additionally, a single line of colored running line of dots for a monitored event may slowly morph/shade in color from one color to another to indicate worsening and/improvement of safety status.

The above examples are not intended to be limiting and any combination of numbers, symbols, colors, graphics, and/or lines may be displayed to enable an engineer to quickly assess the safety level of a monitored event. Further, the statuses and/or changes in status of various events may be stored for post-processing, if desired.

In an embodiment, the graphs one or more graphs can be displayed in concert and/or coincidentally. Groupings of desired monitored events may be displayed in proximity—for example, by area of plant, by function, by sensitivity to certain conditions or factors (e.g., during certain phases of a batch process), etc. An engineer may be able to mask the display view to at a glance be able to view the particular safety events of interest.

Further, visualizations may be provided for more abstract safety events. As discussed above, a monitored safety event may be an abstraction of a group of monitored events, such as monitor and effect blocks.

For example, referring to FIGS. 5 and 6, the enablers or direct inputs into the effect blocks EB1 and EB2 could be a monitored safety event and/or each effect E1, E2, etc. of the effect blocks EB1 and EB2 could be a monitored safety event. Each of the conditions or inputs of which each desired monitored event is comprised may contribute to the degree of change of its status. For example, if a monitored event requires four conditions in order to trigger the event, then when one condition is present, the status of the monitored event may be "−1", when two conditions are present, the status of the monitored event may be "−2", when three conditions are present, the status of the monitored event may be "−3" and when all four conditions are present, the status may be "X" or "tripped". Thus, as an example, the symbols, numbers, dots, etc. of FIGS. 16A-16D could represent different possible states of an effect (or of a cause), or could represent the number of causes that are set or that are in a true state out of the total number of causes needed to be set or in the true state to trip or initiate the effect signal.

Further, a click or other user indication on a particular safety status or status change indicator may automatically link the user to details of the corresponding condition(s). As described above, an engineer may access a SRS, a system configuration and/or a CEM display from the safety event visualization graphs. For example, and referring to the above example of four conditions required to trip a monitored event, if the safety visualization indicates "−1" for the above example monitored event of graph 1620 and the user clicks on the "−1," a display view of the system configuration including the device or piece of equipment causing the condition corresponding to the "−1" safety status may be displayed.

Figure 17:
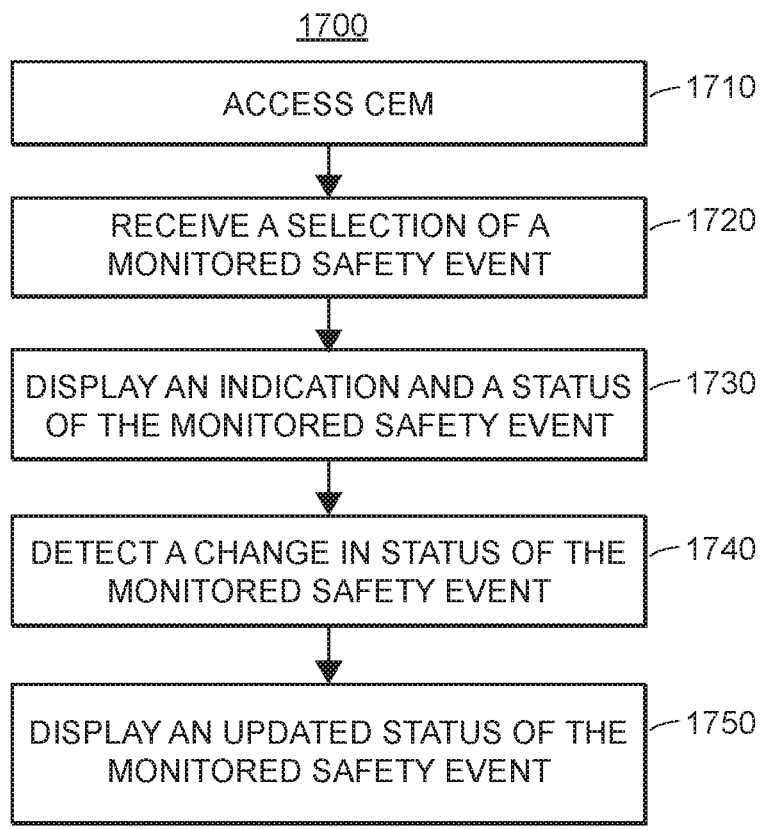
FIG. 17 is a flowchart of an example method for displaying a monitored safety event.

FIG. 17 depicts is a block diagram of an example method 1700 of visualizing safety events within a process plant. The method 1700 may be facilitated by a server or otherwise any type of electronic device, where the server may be equipped with or connected to a user interface configured to display content.

The method 1700 may begin when the server accesses (block 1710) a CEM having a set of causes and a set of effects. In embodiments, each of the set of causes may represent a condition within the process plant and each of the set of effects may represent an effect to be performed within the process plant. Further, at least some of the set of causes and the set of effects may be related as cause-effect pairs whereby the corresponding effect may activate in response to an occurrence of the corresponding condition, and the set of causes and the set of effects may be representative of a set of monitored safety events within the process plant.

The server may receive (block 1720), via the user interface, a selection of monitored safety event of the set of monitored safety events. Further, the server may display (block 1730), in the user interface, an indication of the monitored safety event and a current status of the monitored safety event. In embodiments, the server may display the current status as one or more first graphical objects.

The server may detect (block 1740) a change in status to the monitored safety event. In an embodiment, the server may detect the change in status in response to a time period expiring. The server may also display (block 1750), in the user interface, an updated status of the monitored safety event according to the change in status. In embodiments, the server may display the updated status as one or more second graphical objects that may be different from the one or more first graphical objects. Further, in embodiments, the server may determine a degree of change between the current status and the updated status of the monitored safety event, and may display, in the user interface, the degree of change.

In an embodiment, the server may further determine, in response to a time period expiring, that the updated status of the monitored safety event did not change, and may display, in the user interface, the updated status of the monitored safety event. Additionally or alternatively, the server may receive, via the user interface, a selection of the updated status of the monitored safety event, wherein the monitored safety event may have a set of associated conditions, and may display, in the user interface, a condition status for each of the set of associated conditions. Additionally or alternatively, the server may receive, via the user interface, a selection of the updated status of the monitored safety event, wherein the monitored safety event may have an associated condition that is present, and may display, in the user interface, an indication of a device within the process plant that is causing the associated condition to be present.

Additionally or alternatively, the server may store, in memory, data representative of the monitored safety event, the current status of the monitored safety event, and the updated status of the monitored safety event. Moreover, additionally or alternatively, the server may display, in the user interface, (i) an additional indication of an additional monitored safety event of the set of monitored safety events, and (ii) an additional current status of the additional monitored safety event, detect an additional change in status to the additional monitored safety event, and display, in the user interface, an additional updated status of the additional monitored safety event according to the additional change in status.

The example CEMs provided above are simplistic representations intended for illustrative purposes. FIG. 18 illustrates an example CEM 1800 which is a more complex CEM including time delay triggers, permissive triggers, immediate triggers and reset triggers. The CEM 1800 is a more substantial example of a CEM which is a more accurate representation of a real-world CEM. In the CEM 1800 as illustrated in FIG. 18, the cells that contain only an "X" may represent an immediate trigger effect. Further, any cell populated with only an "R" may represent that if the cause is received, the effect will be triggered to reset. Cells of the CEM 1800 that begin with the letter "T" may indicate that the cause directly triggers the effect, but with a time delay. Time delays can be set in predetermined increments. For example, "T1" may correspond to a time delay of 10 seconds and "T2" may correspond to a time delay of 20 seconds, etc.

The CEM 1800 also contains cells that contain only numbers, whereby these cells may correspond to "enablers." In particular, the number in the cell identifies the group to which the enabler belongs, where there may be one or more enablers for each group. Cells in the CEM 1800 that begin with a number but also have other characters may represent relationships which only trigger the effect if the enablers are also triggered. In some embodiments, every cell related to the corresponding enabler (or enablers) must be "on" for the effect to be triggered. In other embodiments, any combination of causes in the particular enabler group can be combined to trigger the effect. Similarly, any combination of enablers may be required to trigger the effect.

For example, in the CEM 1800 as illustrated in FIG. 18, a cause 1801 is the enabler for group 1. Thus, if a cause 1802 is tripped, the corresponding effects may not be triggered unless cause 1801 is also tripped. This cause and effect relationship is considered a permissive relationship because the effect is only triggered if the enabler is "on." Continuing with the example, a cell 1803 indicates that the cause and effect relationship belongs to enabler group 1 and that the effect 1805 will be triggered with a time delay corresponding to the length T1 when the cause signal 1802 goes high and the enabler cause signal 1801 is also high or on. A cell 1804 indicates that the cause and effect relationship is permissive and belongs to enabler group 1 and that the effect 1806 will be triggered immediately if the cause signal 1802 is both enabled (i.e. the cause signal 1801 is on) and tripped.

CEM 1800 may be implemented in all of the previous methods 700, 1000, 1200, 1400, 1500, and 1700 described above. Moreover, the monitor and effect blocks described herein for implementing a CEM or the logic of a CEM may be used to implement the complex logic functions and interrelated logic functions of the CEM 1800, for example, or any other logic functions in other CEMs. The benefits of managing a CEM still apply despite the added complexity of CEM 1800. Further, the example CEMs are not intended to be limiting, and any of the methods 700, 1000, 1200, 1400, 1500, and 1700 described above may be implemented with any future embodiments of a cause and effect matrix used to implement safety logic in a process plant.

Each of the methods 700, 1000, 1200, 1400, 1500 and 1700 of FIGS. 7, 10, 12, 14, 15 and 17 may be implemented by software, firmware, or hardware, or some combination of software, firmware, and/or hardware. Additionally, although the flow diagrams of FIGS. 7, 10, 12, 14, 15, 17 were described as routines, these flow diagrams could be implemented by software, hardware, firmware, or a combination of software, firmware, and/or hardware.

Embodiments of a user interface, such as the user interfaces described above, may be implemented, in whole or in part, by a processor, for example, configured according to a software program. For instance, the workstation 18*a* or 20*a*, or some other computer, may implement, in whole or in part, the above-described user interface. A software program for implementing embodiments of a user interface may be embodied in software stored on a tangible medium such as a hard disk, a RAM, a battery backed-up RAM, a ROM, a CD-ROM, a PROM, an EPROM, an EEPROM, a DVD, a flash memory, etc., or a memory, such as a RAM, associated with the processor, but persons of ordinary skill in the art will readily appreciate that the entire program or parts thereof could alternatively be executed by a device other than a processor, and/or embodied in firmware and/or dedicated hardware in a well-known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed:

1. A computer-implemented method of visualizing safety events within a process plant, the method comprising:
accessing a cause and effect matrix (CEM) having a set of causes and a set of effects, wherein each of the set of causes represents a condition within the process plant and each of the set of effects represents an effect to be performed within the process plant, wherein each of the set of effects are related to one or more causes of the set of causes as one or more cause-effect pairs whereby a corresponding effect activates in response to an occurrence of one or more corresponding causes, and wherein each of a set of monitored safety events within the process plant corresponds to the one or more cause-effect pairs;
receiving, via a user interface, a selection of a monitored safety event of the set of monitored safety events;
determining, a first status of the monitored safety event at a first time, wherein the first status indicates a safety level of the monitored safety event corresponding to a safety logic of the CEM, where the safety level indicates a degree of degradation from a normal operating state based on the one or more cause-effect pairs corresponding to the monitored safety event, where the degree of degradation is determined based on a number of the one or more cause-effect pairs that have been tripped out of a total number of the one or more cause-effect pairs corresponding to the monitored safety event;
detecting a change in status to the monitored safety event indicating that the number of the one or more cause-effect pairs that have been tripped has changed;
in response to the change in status:
determining a second status of the monitored safety event at a second time according to the change in status; and
displaying, in the user interface, an indication of the monitored safety event over time including at least the first status and the second status.

2. The computer-implemented method of claim 1, wherein detecting the change in status to the monitored safety event comprises:
in response to a time period expiring, detecting the change in status to the monitored safety event.

3. The computer-implemented method of claim 1, wherein displaying the indication of the monitored safety event comprises:
displaying the first status of the monitored safety event as a first graphical object; and
displaying the second status of the monitored safety event as a second graphical object different from the first graphical object.

4. The computer-implemented method of claim 1, wherein displaying the indication of the monitored safety event comprises:
- displaying the first status of the monitored safety event as at least two first graphical objects; and
- displaying the second status of the monitored safety event as at least two second graphical objects.

5. The computer-implemented method of claim 1, wherein displaying the indication of the monitored safety event comprises:
- determining a degree of change between the first status and the second status of the monitored safety event; and
- displaying, in the user interface, the degree of change.

6. The computer-implemented method of claim 1, further comprising:
- in response to a time period expiring, determining that the second status of the monitored safety event did not change; and
- displaying, in the user interface, an indication that the second status of the monitored safety event is unchanged.

7. The computer-implemented method of claim 1, further comprising:
- receiving, via the user interface, a selection of the second status of the monitored safety event, wherein the monitored safety event has a set of associated conditions; and
- displaying, in the user interface, a condition status for each of the set of associated conditions.

8. The computer-implemented method of claim 1, further comprising:
- receiving, via the user interface, a selection of the second status of the monitored safety event, wherein the monitored safety event has an associated condition that is present; and
- displaying, in the user interface, an indication of a device within the process plant that is causing the associated condition to be present.

9. The computer-implemented method of claim 1, further comprising:
- storing, in memory, data representative of the monitored safety event, the first status of the monitored safety event, and the second status of the monitored safety event.

10. The computer-implemented method of claim 1, further comprising:
- displaying, in the user interface, an additional indication of an additional monitored safety event over time including at least an additional first status and an additional second status.

11. A system for visualizing safety events within a process plant, comprising:
- a user interface;
- a memory configured to store (i) a set of computer-executable instructions, and (ii) a cause and effect matrix (CEM) having a set of causes and a set of effects, wherein each of the set of causes represents a condition within the process plant and each of the set of effects represents an effect to be performed within the process plant, wherein each of the set of effects are related to one or more causes of the set of causes as one or more cause-effect pairs whereby a corresponding effect activates in response to an occurrence of one or more corresponding causes, and wherein each of a set of monitored safety events within the process plant corresponds to the one or more cause-effect pairs;
- a processor interfaced with the user interface and the memory, and configured to execute the set of computer-executable instructions to cause the processor to:
  - receive, via the user interface, a selection of a monitored safety event of the set of monitored safety events,
  - determine, a first status of the monitored safety event at a first time, wherein the first status indicates a safety level of the monitored safety event corresponding to a safety logic of the CEM, where the safety level indicates a degree of degradation from a normal operating state based on the one or more cause-effect pairs corresponding to the monitored safety event, where the degree of degradation is determined based on a number of the one or more cause-effect pairs corresponding to the monitored safety event that have tripped out of a total number of the one or more cause-effect pairs corresponding to the monitored safety event,
  - detect a change in status to the monitored safety event indicating that the number of the one or more cause-effect pairs that have been tripped has changed,
  - in response to the change in status:
    - determine a second status of the monitored safety event at a second time according to the change in status, and
    - cause the user interface to display an indication of the monitored safety event over time including at least the first status and the second status.

12. The system of claim 11, wherein to detect the change in status to the monitored safety event, the processor is configured to:
- in response to a time period expiring, detect the change in status to the monitored safety event.

13. The system of claim 11, wherein to cause the user interface to display the indication of the monitored safety event, the processor is configured to:
- cause the user interface to display the first status of the monitored safety event as a first graphical object, and
- cause the user interface to display the second status of the monitored safety event as a second graphical object different from the first graphical object.

14. The system of claim 11, wherein to cause the user interface to display the indication of the monitored safety event, the processor is configured to:
- cause the user interface to display the first status of the monitored safety event as at least two first graphical objects, and
- cause the user interface to display the second status of the monitored safety event as at least two second graphical objects.

15. The system of claim 11, wherein to cause the user interface to display the indication of the monitored safety event, the processor is configured to:
- determine a degree of change between the first status and the second status of the monitored safety event, and
- cause the user interface to display the degree of change.

16. The system of claim 11, wherein the processor is further configured to:
- in response to a time period expiring, determine that the second status of the monitored safety event did not change, and
- cause the user interface to display an indication that the second status of the monitored safety event is unchanged.

17. The system of claim 11, wherein the processor is further configured to:

receive, via the user interface, a selection of the second status of the monitored safety event, wherein the monitored safety event has a set of associated conditions, and cause the user interface to display a condition status for each of the set of associated conditions.

18. The system of claim 11, wherein the processor is further configured to:

receive, via the user interface, a selection of the second status of the monitored safety event, wherein the monitored safety event has an associated condition that is present, and cause the user interface to display an indication of a device within the process plant that is causing the associated condition to be present.

19. The system of claim 11, wherein the processor is further configured to:

store, in the memory, data representative of the monitored safety event, the first status of the monitored safety event, and the second status of the monitored safety event.

20. The system of claim 11, wherein the processor is further configured to:

cause the user interface to display an additional indication of an additional monitored safety event over time including at least an additional first status and an additional second status.

21. A computer-implemented method of visualizing safety events within a process plant, the method comprising:

accessing safety logic corresponding to the process plant having a set of causes and a set of effects, wherein each of the set of causes represents a condition within the process plant and each of the set of effects represents an action to be performed within the process plant, wherein each of the set of effects are related to one or more causes as cause-effect pairs whereby a corresponding effect activates in response to an occurrence of one or more corresponding causes, and wherein each of a set of monitored safety events within the process plant corresponds to one or more of the cause-effect pairs;

receiving, via a user interface, a selection of a monitored safety event of the set of monitored safety events;

determining, a current status of the monitored safety event, wherein the current status indicates a safety level of the monitored safety event corresponding to the safety logic, where the safety level indicates a degree of degradation from a normal operating state based on the one or more cause-effect pairs corresponding to the monitored safety event, where the degree of degradation is determined based on a number of the one or more cause-effect pairs corresponding to the monitored safety event that have been tripped out of a total number of the one or more cause-effect pairs corresponding to the monitored safety event;

displaying, in the user interface, the current status of the monitored safety event.

22. The computer implemented method of claim 21, further comprising:

displaying, in the user interface, a menu of one or more representation types for the monitored safety event;

receiving, via the user interface, a selection of a representation type; and displaying, in the user interface, the current status of the monitored safety event according to the representation type.

23. The computer implemented method of claim 22, wherein the representation type is one or more of a symbol, a color, a graphic, a line, a numeric display.

24. The computer implemented method of claim 21, further comprising:

receiving, via the user interface, a selection of a second monitored safety event; and displaying, via the user interface and coincidentally with the current status of the monitored safety event, a current status of the second monitored safety event.

25. The computer implemented method of claim 21, further comprising:

determining that the selected monitored safety event corresponds to an effect from the set of effects; and displaying, via the user interface, information related to one or more conditions that correspond to the effect.

26. The computer implemented method of claim 21, wherein the selection of the monitored safety event is a first selection, the method further comprising:

receiving, via the user interface, a second selection of an element of the user interface displaying the current status of the monitored safety event; and displaying, via the user interface, a view of the system configuration including a device corresponding to the selected element.

27. The computer implemented method of claim 21, further comprising:

determining that the monitored safety event corresponds to an effect corresponding to one or more conditions of the process plant; and displaying, via the user interface, an indication of each of the conditions.

\* \* \* \* \*

UNITED STATES PATENT AND TRADEMARK OFFICE
CERTIFICATE OF CORRECTION

Page 1 of 2

PATENT NO. : 12,164,275 B2
APPLICATION NO. : 15/766905
DATED : December 10, 2024
INVENTOR(S) : Gary K. Law et al.

It is certified that error appears in the above-identified patent and that said Letters Patent is hereby corrected as shown below:

On the Title Page

At page 3, in Column 2, item (56), under "OTHER PUBLICATIONS", Line 7, "Notifiation" should be -- Notification --.

At page 3, in Column 2, item (56), under "OTHER PUBLICATIONS", Line 9, "Notifiation" should be -- Notification --.

At page 3, in Column 2, item (56), under "OTHER PUBLICATIONS", Line 11, "Notifiation" should be -- Notification --.

At page 3, in Column 2, item (56), under "OTHER PUBLICATIONS", Line 13, "Notifiation" should be -- Notification --.

At page 3, in Column 2, item (56), under "OTHER PUBLICATIONS", Line 15, "Notifiation" should be -- Notification --.

At page 3, in Column 2, item (56), under "OTHER PUBLICATIONS", Line 45, "Notifiation" should be -- Notification --.

In the Specification

At Column 4, Line 32, "event;" should be -- event; and --.

At Column 5, Line 57, "ma devices" should be -- mA devices --.

At Column 5, Line 63, "ma devices," should be -- mA devices, --.

At Column 6, Line 53, "ma protocol," should be -- mA protocol, --.

Signed and Sealed this
Eighteenth Day of November, 2025

John A. Squires
*Director of the United States Patent and Trademark Office*

CERTIFICATE OF CORRECTION (continued)
U.S. Pat. No. 12,164,275 B2

At Column 9, Line 44, "trigging" should be -- triggering --.

At Column 10, Line 37, "cells" should be -- cells in a --.

At Column 13, Lines 13-14, "CFG_MASK 1, CFG_MASK 2, and CFG_MASK 3" should be -- CFG_MASK1, CFG_MASK2, and CFG_MASK3 --.

At Column 14, Line 36, "Delay_Time 1" should be -- Delay_Time1 --.

At Column 14, Line 40, "to" should be -- to be --.

At Column 15, Line 5, "by" should be -- be --.

At Column 18, Line 65, "combination or" should be -- combination of --.

At Column 19, Line 32, "log-in" should be -- login --.

At Column 21, Line 37, "(e.g.," should be -- e.g., --.

At Column 21, Line 39, "(indicting" should be -- (indicating --.

At Column 23, Line 51, "depicts is a" should be -- depicts a --.

At Column 27, Line 8, "and/improvement" should be -- and/or improvement --.